(12) United States Patent
Wang et al.

(10) Patent No.: US 12,720,346 B2
(45) Date of Patent: Aug. 25, 2026

(54) METHOD FOR CALCULATING CARRIER SPECIFIC SCALING FACTOR OUTSIDE MEASUREMENT GAP AND COMMUNICATION APPARATUS

(71) Applicant: HUAWEI TECHNOLOGIES CO., LTD., Shenzhen (CN)

(72) Inventors: Xuesong Wang, Beijing (CN); Li Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 842 days.

(21) Appl. No.: 17/953,791

(22) Filed: Sep. 27, 2022

(65) Prior Publication Data

US 2023/0030224 A1 Feb. 2, 2023

Related U.S. Application Data

(63) Continuation of application No. PCT/CN2021/086148, filed on Apr. 9, 2021.

(30) Foreign Application Priority Data

Apr. 10, 2020 (CN) ......................... 202010278668.8

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS 12,316,467 B2 * 5/2025 Wu ....................... H04L 5/0037
2019/0274146 A1 9/2019 Tang et al.
(Continued)

FOREIGN PATENT DOCUMENTS

CN 110557976 A 12/2019
CN 110602794 A 12/2019

OTHER PUBLICATIONS

3GPP TS 38.133 V16.3.0 (Mar. 2020), 3rd Generation Partnership Project; Technical Specification Group Radio Access Network;NR-;Requirements for support of radio resource management(Release 16),1170 pages.
(Continued)

*Primary Examiner* — Srinivasa R Reddivalam
(74) *Attorney, Agent, or Firm* — HAUPTMAN HAM, LLP

(57) ABSTRACT

A method for calculating a carrier specific scaling factor and a communication apparatus. In an EN-DC scenario, a terminal device receives configuration information, sent by a network device, of an NR frequency, that is of service frequency inter-system measurement, non-service frequency inter-system measurement, PSCC intra-frequency measurement, SCC intra-frequency measurement, and inter-frequency measurement, where the service frequency inter-system measurement, the non-service frequency inter-system measurement, the PSCC intra-frequency measurement, the SCC intra-frequency measurement, and the inter-frequency measurement unsupported by an MG, and the terminal device calculates a CSSF outside the MG of each to-be-measured NR frequency in measurement types. Therefore, a CSSF of NR inter-system measurement is included in calculation of the CSSF outside the MG, to avoid a case in which the terminal device is unable to report
(Continued)

a measurement result of inter-system measurement within a measurement delay.

20 Claims, 3 Drawing Sheets

(56) References Cited

U.S. PATENT DOCUMENTS

2019/0306734 A1* 10/2019 Huang .................. H04W 24/08
2020/0077312 A1* 3/2020 Tsuboi ................. H04B 17/309
2022/0191720 A1* 6/2022 Cui ....................... H04L 5/0048

OTHER PUBLICATIONS

3GPP TS 36.133 V16.5.0 (Mar. 2020), 3rd Generation Partnership Project;Technical Specification Group Radio Access Network;Evolved Universal Terrestrial Radio Access (E-UTRA);Requirements for support of radio resource management(Release 16), 3122 pages.
R4-1815146, Huawei et al, CSSF for PRS periodicy=160ms in TS38.133, 3GPP TSG-RAN WG4 Meeting #89, Spokane, US, Nov. 12-Nov. 16, 2018, 5 pages.
3GPP TS 38.331 V16.0.0 (Mar. 2020), 3rd Generation Partnership Project;Technical Specification Group Radio Access Network;NR-;Radio Resource Control (RRC) protocol specification(Release 16), 835 pages.

* cited by examiner

METHOD FOR CALCULATING CARRIER SPECIFIC SCALING FACTOR OUTSIDE MEASUREMENT GAP AND COMMUNICATION APPARATUS

CROSS-REFERENCE TO RELATED APPLICATIONS

This application is a continuation of International Application No. PCT/CN2021/086148, filed on Apr. 9, 2021, which claims priority to Chinese Patent Application No. 202010278668.8, filed on Apr. 10, 2020. The disclosures of the aforementioned applications are hereby incorporated in entirety by reference.

BACKGROUND

In a cellular communication system, a terminal device performs, according to an instruction of a network device, mobility measurement on a frequency unsupported by a measurement gap (measurement gap, MG). In an existing protocol, intra-frequency measurement and/or inter-frequency measurement are/is considered in calculation of a carrier specific scaling factor (carrier specific scaling factor, CSSF) that is of a to-be-measured frequency and unsupported by the measurement gap, and a terminal device strictly implemented based on the protocol is unable to report a measurement result of inter-system measurement within a measurement delay.

SUMMARY

Some embodiments provide a method for calculating a carrier specific scaling factor outside a measurement gap and a communication apparatus. A CSSF of NR inter-system measurement is included in calculation of a CSSF outside an MG, to avoid a case in which a terminal device is unable to report a measurement result of inter-system measurement within a measurement delay.

In some embodiments, a method for calculating a carrier specific scaling factor outside a measurement gap is provided. The method is applied to an evolved universal terrestrial radio access-new radio dual-connectivity EN-DC system, and the method includes: A terminal device receives first measurement configuration information sent by an evolved universal terrestrial radio access E-UTRAN primary cell, where the first measurement configuration information includes M1 first measurement objects and M2 second measurement objects, M1≥0, M2≥0, M1 and M2 are integers, the first measurement object is an NR measurement object configured on a primary secondary component carrier PSCC or a secondary component carrier SCC, and the second measurement object is an NR measurement object configured on a frequency outside the PSCC and the SCC; the terminal device receives second measurement configuration information sent by a new radio NR primary secondary cell, where the second measurement configuration information includes M3 third measurement objects, M4 fourth measurement objects, and M5 fifth measurement objects, 0≤M3≤1, M4≥0, M5≥0, M3, M4, and M5 are integers, the third measurement object is an NR measurement object configured on the PSCC, the fourth measurement object is an NR measurement object configured on the SCC, and the fifth measurement object is an NR measurement object configured on the frequency outside the PSCC and the SCC; and the terminal device calculates a CSSF outside a measurement gap of each measurement object in the M1 first measurement objects, the M2 second measurement objects, the M3 third measurement objects, the M4 fourth measurement objects, and the M5 fifth measurement objects.

In some embodiments, the first measurement configuration information and the second configuration information alternatively is configured by a network device corresponding to a cell.

In some embodiments, the first measurement object is an NR frequency configured on the primary secondary component carrier PSCC or the secondary component carrier SCC, the terminal device performs, on the first measurement object, service frequency inter-system measurement outside the MG; and the second measurement object is an NR frequency configured outside the primary secondary component carrier PSCC or the secondary component carrier SCC, the terminal device performs, on the second measurement object, non-service frequency inter-system measurement outside the MG.

In some embodiments, for a terminal device that supports carrier aggregation, two searchers of UE support parallel execution of at most two NR measurements unsupported by the MG. The first measurement configuration information includes service frequency inter-system measurement on the SCC, and the second measurement configuration information includes intra-frequency measurement on the SCC.

In some embodiments, measurement opportunities are allocated, on two searchers of the terminal device, to different measurement types unsupported by the MG, to calculate a CSSF outside the measurement gap of each NR measurement frequency.

In some embodiments, the terminal device includes the CSSF of the NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, the first measurement object meets the following conditions: A synchronization signal block SSB indicated by the first measurement object is entirely included in an active bandwidth part BWP of the terminal device; and synchronization signal block measurement timing configuration SMTC included in the first measurement object is not covered by the MG, or is partially covered by the MG.

In some embodiments, the second measurement object meets the following conditions: An SSB indicated by the second measurement object is entirely included in an active BWP of the terminal device; and SMTC included in the second measurement object is not covered by the MG, or is partially covered by the MG.

In some embodiments, the third measurement object meets the following conditions: An SSB indicated by the third measurement object is entirely included in an active BWP of the terminal device, or an active downlink BWP is an initial BWP; and SMTC included in the third measurement object is not covered by the MG, or is partially covered by the MG.

In some embodiments, the fourth measurement object meets the following conditions: An SSB indicated by the fourth measurement object is entirely included in an active BWP of the terminal device, or an active downlink BWP is an initial BWP; and SMTC included in the fourth measurement object is not covered by the MG, or is partially covered by the MG.

In some embodiments, the fifth measurement object meets the following conditions: An SSB indicated by the fifth measurement object is entirely included in an active BWP of the terminal device; and SMTC included in the fifth measurement object is not covered by the MG, or is partially covered by the MG.

In some embodiments, that the terminal device calculates a CSSF outside a measurement gap of each measurement object in the M1 first measurement objects, the M2 second measurement objects, the M3 third measurement objects, the M4 fourth measurement objects, and the M5 fifth measurement objects includes:

in response to TNR serving cells of the terminal device being in a first frequency range FR1, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5;

in response to NR serving cells of the terminal device being in a second frequency range FR2, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5;

in response to NR serving cells of the terminal device being separately located in an FR1 and an FR2, and a primary secondary cell PSCell is located in the FR1, a CSSF of the first measurement object is equal to 2*(M1+M2+M4+M5−1), a CSSF of the second measurement object is equal to 2*(M1+M2+M4+M5−1), and a CSSF of the third measurement object is equal to 1;

in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 2*(M1+M2+M4+M5−1), and a CSSF of the fifth measurement object is equal to 2*(M1+M2+M4+M5−1); and in response to NR serving cells of the terminal device being separately located in an FR1 and an FR2, and a primary secondary cell PSCell is located in the FR2, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5.

In some embodiments, the terminal device includes the CSSF of the NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF outside a measurement gap of each measurement object in the M1 first measurement objects, the M2 second measurement objects, the M3 third measurement objects, the M4 fourth measurement objects, and the M5 fifth measurement objects includes:

in response to NR serving cells of the terminal device being in a first frequency range FR1, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where $0<X<100$;

in response to NR serving cells of the terminal device being on a same band in a second frequency range FR2, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where $0<X<100$;

in response to NR serving cells of the terminal device being separately located in an FR1 and an FR2, and a primary secondary cell PSCell is located in the FR1, a CSSF of the first measurement object is equal to 100/X*M1, a CSSF of the second measurement object is equal to 100/(50−X)*(M4+M2+M5−1), a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)*(M4+M2+M5−1), and a CSSF of the fifth measurement object is equal to 100/(50−X)*(M4+M2+M5−1), where $0<X<50$; and in response to NR serving cells of the terminal device being separately in an FR1 and an FR2, and a primary secondary cell PSCell is in the FR2, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where $0<X<100$.

In some embodiments, the terminal device includes the CSSF of the NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF outside a measurement gap of each measurement object in the M1 first measurement objects, the M2 second measurement objects, the M3 third measurement objects, the M4 fourth measurement objects, and the M5 fifth measurement objects includes:

in response to NR serving cells of the terminal device being in a first frequency range FR1, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where $0<X<100$;

in response to NR serving cells of the terminal device being on a same band in a second frequency range FR2, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100;

in response to NR serving cells of the terminal device being separately located in an FR1 and an FR2, and a primary secondary cell PSCell is located in the FR1, a CSSF of the first measurement object is equal to 100/X*(M1+M2), a CSSF of the second measurement object is equal to 100/X*(M1+M2), a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)(M4+M5−1), and a CSSF of the fifth measurement object is equal to 100/(50−X)(M4+M5−1), where 0<X<50; and in response to NR serving cells of the terminal device being separately in an FR1 and an FR2, and a primary secondary cell PSCell is in the FR2, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100.

In some embodiments, the terminal device includes the CSSF of the NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF outside a measurement gap of each measurement object in the M1 first measurement objects, the M2 second measurement objects, the M3 third measurement objects, the M4 fourth measurement objects, and the M5 fifth measurement objects includes:

in response to NR serving cells of the terminal device being in a first frequency range FR1, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100; and in response to NR serving cells of the terminal device being on a same band in a second frequency range FR2, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100;

in response to NR serving cells of the terminal device being separately located in an FR1 and an FR2, and a primary secondary cell PSCell is located in the FR1, a CSSF of the first measurement object is equal to 100/(50−X)*(M4+M1+M5−1), a CSSF of the second measurement object is equal to 100/X*M2, a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)*(M4+M1+M5−1), and a CSSF of the fifth measurement object is equal to 100/(50−X)*(M4+M1+M5−1), where 0<X<50; and in response to NR serving cells of the terminal device being separately in an FR1 and an FR2, and a primary secondary cell PSCell is in the FR2, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100.

In some embodiments, the terminal device includes the CSSF of the NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, the terminal device determines X based on any one of the following methods: The terminal device receives a first message sent by the network device, where the first message includes X; and the terminal device determines X based on the first message. Alternatively, the terminal device receives a second message sent by the network device, where the second message includes a plurality of candidate measurement resource allocation proportions including X; the terminal device receives first indication information sent by the network device, where the first indication information is used to indicate the terminal device to allocate a measurement resource by using X; and the terminal device determines X according to the first indication information. Alternatively, the terminal device determines X based on a fixed measurement resource allocation proportion described in a protocol.

In some embodiments, X=25 or 50.

In some embodiments, a method for calculating a carrier specific scaling factor outside a measurement gap is provided. The method is applied to an evolved universal terrestrial radio access-new radio dual-connectivity EN-DC system, and the method includes: A terminal device receives first measurement configuration information sent by an evolved universal terrestrial radio access E-UTRAN primary cell, where the first measurement configuration information includes M1 first measurement objects and M2 second measurement objects, 0≤M1≤1, M2≥0, M1 and M2 are integers, the first measurement object is an NR measurement object configured on a primary secondary component carrier PSCC, and the second measurement object is an NR measurement object configured on a frequency outside the PSCC; the terminal device receives second measurement configuration information sent by a new radio NR primary secondary cell, where the second measurement configuration information includes M3 third measurement objects and M5 fifth measurement objects, 0≤M3≤1, M5≥0, M3 and M5 are integers, the third measurement object is an NR measurement object configured on the PSCC, and the fifth measurement object is an NR measurement object configured on the frequency outside the PSCC; and the terminal device calculates a CSSF outside a measurement gap MG of each measurement object in the M1 first measurement objects, the M2 second measurement objects, the M3 third measurement objects, and the M5 fifth measurement objects.

Optionally, the first measurement configuration information and the second configuration information alternatively is configured by a network device corresponding to a cell.

In some embodiments, the first measurement object is an NR frequency configured on the primary secondary component carrier PSCC, the terminal device performs, on the first measurement object, PSCC service frequency inter-system measurement outside the MG; and the second measurement object is an NR frequency configured outside the primary secondary component carrier PSCC, the terminal device performs, on the second measurement object, non-service frequency inter-system measurement outside the MG.

In some embodiments, for a terminal device that does not support carrier aggregation, the first measurement configuration information does not include service frequency inter-system measurement on an SCC, and the second measurement configuration information does not include intra-frequency measurement on the SCC. In the foregoing solution, measurement opportunities are allocated, on one searcher of the terminal device, to different measurement types unsupported by the MG, to calculate a CSSF outside the measurement gap of each NR measurement frequency.

In some embodiments, the terminal device includes a CSSF of NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, the first measurement object meets the following conditions: A synchronization signal block SSB indicated by the first measurement object is entirely included in an active bandwidth part BWP of the terminal device; and synchronization signal block measurement timing configuration SMTC included in the first measurement object is not covered by the MG, or is partially covered by the MG.

In some embodiments, the second measurement object meets the following conditions: An SSB indicated by the second measurement object is entirely included in an active BWP of the terminal device; and SMTC included in the second measurement object is not covered by the MG, or is partially covered by the MG.

In some embodiments, the third measurement object meets the following conditions: An SSB indicated by the third measurement object is entirely included in an active BWP of the terminal device, or an active downlink BWP is an initial BWP; and SMTC included in the third measurement object is not covered by the MG, or is partially covered by the MG.

In some embodiments, the fifth measurement object meets the following conditions: An SSB indicated by the fifth measurement object is entirely included in an active BWP of the terminal device; and SMTC included in the fifth measurement object is not covered by the MG, or is partially covered by the MG.

In some embodiments, that the terminal device calculates a CSSF outside a measurement gap of each measurement object in the M1 first measurement objects, the M2 second measurement objects, the M3 third measurement objects, and the M5 fifth measurement objects includes: A CSSF of the first measurement object is equal to 100/(100−M3*X)*(M1+M2+M5), a CSSF of the second measurement object is equal to 100/(100−M3*X)*(M1+M2+M5), a CSSF of the third measurement object is equal to 100/X, and a CSSF of the fifth measurement object is equal to 100/(100−M3*X)*(M1+M2+M5), where 0<X<100.

In some embodiments, the terminal device includes a CSSF of NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF outside a measurement gap of each measurement object in the M1 first measurement objects, the M2 second measurement objects, the M3 third measurement objects, and the M5 fifth measurement objects includes: A CSSF of the first measurement object is equal to 100/Y, a CSSF of the second measurement object is equal to 100/(100−M3*X−M1*Y)*(M2+M5), a CSSF of the third measurement object is equal to 100/X, and a CSSF of the fifth measurement object is equal to 100/(100−M3*X−M1*Y)*(M2+M5), where 0<X<100, 0<Y<100, and 0<X+Y<100.

In some embodiments, the terminal device includes a CSSF of NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF outside a measurement gap of each measurement object in the M1 first measurement objects, the M2 second measurement objects, the M3 third measurement objects, and the M5 fifth measurement objects includes: A CSSF of the first measurement object is equal to 100/Y*(M1+M2), a CSSF of the second measurement object is equal to 100/Y*(M1+M2), and a CSSF of the third measurement object is equal to 100/X; and in response to M1=0 and M2=0, a CSSF of the fifth measurement object being equal to 100/(100−M3*X)*M5, or otherwise, the CSSF of the fifth measurement object is equal to 100/(100−M3*X−Y)*M5, where 0<X<100, 0<Y<100, and 0<X+Y<100.

In some embodiments, the terminal device includes a CSSF of NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF outside a measurement gap of each measurement object in the M1 first measurement objects, the M2 second measurement objects, the M3 third measurement objects, and the M5 fifth measurement objects includes: In response to M2=0, a CSSF of the first measurement object being equal to 100/(100−M3*X)*(M1+M5), or otherwise, the CSSF is equal to 100/(100−M3*X−Y)*(M1+M5), a CSSF of the second measurement object is equal to 100/Y*M2, a CSSF of the third measurement object is equal to 100/X, and a CSSF of the fifth measurement object is 100/(100−M3*X)

*(M1+M5), or otherwise, the CSSF is equal to 100/(100−M3*X−Y)*(M1+M5), where 0<X<100, 0<Y<100, and 0<X+Y<100.

In some embodiments, the terminal device includes a CSSF of NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, that the terminal device calculates a CSSF of each measurement object in the M1 first measurement objects, the M2 second measurement objects, the M3 third measurement objects, and the M5 fifth measurement objects includes: A CSSF of the first measurement object is equal to M1+M2+M3+M5, a CSSF of the second measurement object is equal to M1+M2+M3+M5, a CSSF of the third measurement object is equal to M1+M2+M3+M5, and a CSSF of the fifth measurement object is equal to M1+M2+M3+M5.

In some embodiments, the terminal device includes a CSSF of NR inter-system measurement in calculation of the CSSF outside the MG. This resolves a problem that a corresponding measurement opportunity is unable to be obtained in inter-system measurement unsupported by the MG, and a case in which the terminal device is unable to report a measurement result of the inter-system measurement within a measurement delay is avoided.

In some embodiments, the terminal device determines X based on any one of the following methods: The terminal device receives a first message sent by the network device, where the first message includes X; and the terminal device determines X based on the first message. Alternatively, the terminal device receives a second message sent by the network device, where the second message includes a plurality of candidate measurement resource allocation proportions including X; the terminal device receives first indication information sent by the network device, where the first indication information is used to indicate the terminal device to allocate a measurement resource by using X; and the terminal device determines X according to the first indication information. Alternatively, the terminal device determines X based on a fixed measurement resource allocation proportion described in a protocol.

In some embodiments, X=25 or 50, and Y=25 or 50.

In some embodiments, a communication apparatus is provided, and includes a receiving unit and a processing unit. The receiving unit is configured to receive first measurement configuration information sent by an evolved universal terrestrial radio access E-UTRAN primary cell, where the first measurement configuration information includes M1 first measurement objects and M2 second measurement objects, M1≥0, M2≥0, M1 and M2 are integers, the first measurement object is an NR measurement object configured on a primary secondary component carrier PSCC or a secondary component carrier SCC, and the second measurement object is an NR measurement object configured on a frequency outside the PSCC and the SCC;

the receiving unit is further configured to receive second measurement configuration information sent by a new radio NR primary secondary cell, where the second measurement configuration information includes M3 third measurement objects, M4 fourth measurement objects, and M5 fifth measurement objects, 0≤M3≤1, M4≥0, M5≥0, M3, M4, and M5 are integers, the third measurement object is an NR measurement object configured on the PSCC, the fourth measurement object is an NR measurement object configured on the SCC, and the fifth measurement object is an NR measurement object configured on the frequency outside the PSCC and the SCC; and the processing unit is configured to calculate a CSSF outside a measurement gap of each measurement object in the M1 first measurement objects, the M2 second measurement objects, the M3 third measurement objects, the M4 fourth measurement objects, and the M5 fifth measurement objects.

Optionally, the communication apparatus further includes a sending unit.

In some embodiments, the first measurement object meets the following conditions: A synchronization signal block SSB indicated by the first measurement object is entirely included in an active bandwidth part BWP of the terminal device; and synchronization signal block measurement timing configuration SMTC included in the first measurement object is not covered by the MG, or is partially covered by the MG.

In some embodiments, the second measurement object meets the following conditions: An SSB indicated by the second measurement object is entirely included in an active BWP of the terminal device; and SMTC included in the second measurement object is not covered by the MG, or is partially covered by the MG.

In some embodiments, the third measurement object meets the following conditions: An SSB indicated by the third measurement object is entirely included in an active BWP of the terminal device, or an active downlink BWP is an initial BWP; and SMTC included in the third measurement object is not covered by the MG, or is partially covered by the MG.

In some embodiments, the fourth measurement object meets the following conditions: An SSB indicated by the fourth measurement object is entirely included in an active BWP of the terminal device, or an active downlink BWP is an initial BWP; and SMTC included in the fourth measurement object is not covered by the MG, or is partially covered by the MG.

In some embodiments, the fifth measurement object meets the following conditions: An SSB indicated by the fifth measurement object is entirely included in an active BWP of the terminal device; and SMTC included in the fifth measurement object is not covered by the MG, or is partially covered by the MG.

In some embodiments, the processing unit is configured to: in response to NR serving cells of a terminal device configured with the apparatus being in a first frequency range FR1, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5; in response to NR serving cells of a terminal device configured with the apparatus being in a second frequency range FR2, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5; in response to NR serving cells of a terminal device configured with the apparatus being separately located in an FR1 and an FR2, and a primary secondary cell PSCell is located in the FR1, a CSSF of the first measurement object is equal to 2*(M1+M2+M4+M5−1), a CSSF of the second measurement object is equal to 2*(M1+M2+M4+M5−1), a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 2*(M1+M2+M4+M5−1), and a CSSF of the fifth measurement object is equal to 2(M1+M2+M4+M5−1); and in response to NR serving cells of a terminal device configured with the apparatus being separately located in an FR1 and an FR2, and a primary secondary cell PSCell is located in the FR2, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5.

In some embodiments, the processing unit is configured to: in response to NR serving cells of a terminal device configured with the apparatus being in a first frequency range FR1, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where 0<X<100; in response to NR serving cells of a terminal device configured with the apparatus being on a same band in a second frequency range FR2, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where 0<X<100; in response to NR serving cells of a terminal device configured with the apparatus being separately located in an FR1 and an FR2, and a primary secondary cell PSCell is located in the FR1, a CSSF of the first measurement object is equal to 100/X*M1, a CSSF of the second measurement object is equal to 100/(50−X)*(M4+M2+M5−1), a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)*(M4+M2+M5−1), and a CSSF of the fifth measurement object is equal to 100/(50−X)*(M4+M2+M5−1), where 0<X<50; and in response to NR serving cells of a terminal device configured with the apparatus being separately located in an FR1 and an FR2, and a primary secondary cell PSCell is located in the FR2, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where 0<X<100.

In some embodiments, the processing unit is configured to: in response to NR serving cells of a terminal device configured with the apparatus being in a first frequency range FR1, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100; in response to NR serving cells of a terminal device configured with the apparatus being on a same band in a second frequency range FR2, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100; in response to NR serving cells of a terminal device configured with the apparatus being separately located in an FR1 and an FR2, and a primary secondary cell PSCell is located in the FR1, a CSSF of the first measurement object is equal to 100/X*(M1+M2), a CSSF of the second measurement object is equal to 100/X*(M1+M2), a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)(M4+M5−1), and a CSSF of the fifth measurement object is equal to 100/(50−X)(M4+M5−1), where 0<X<50; and in response to NR serving cells of a terminal device configured with the apparatus being separately in an FR1 and an FR2, and a primary secondary cell PSCell is in the FR2, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100.

In some embodiments, the processing unit is configured to: in response to NR serving cells of a terminal device configured with the apparatus being in a first frequency range FR1, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100; in response to NR serving cells of a terminal device configured with the apparatus being on a same band in a second frequency range FR2, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100; in response to NR serving cells of a terminal device configured with the apparatus being separately located in an FR1 and an FR2, and a primary secondary cell PSCell is located in the FR1, a CSSF of the first measurement object is equal to 100/(50−X)*(M4+M1+M5−1), a CSSF of the second measurement object is equal to 100/X*M2, a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)*(M4+M1+M5−1), and a CSSF of the fifth measurement object is equal to 100/(50−X)*(M4+M1+M5−1), where 0<X<50; and in response to NR serving cells of a terminal device configured with the apparatus being separately located in an FR1 and an FR2, and a primary secondary cell PSCell is located in the FR2, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100.

In some embodiments, a communication apparatus is provided. A receiving unit is configured to receive first measurement configuration information sent by an evolved universal terrestrial radio access E-UTRAN primary cell, where the first measurement configuration information includes M1 first measurement objects and M2 second measurement objects, 0≤M1≤1, M2≥0, M1 and M2 are integers, the first measurement object is an NR measurement object configured on a primary secondary component carrier PSCC, and the second measurement object is an NR measurement object configured on a frequency outside the PSCC. The receiving unit is further configured to receive second measurement configuration information sent by a new radio NR primary secondary cell, where the second measurement configuration information includes M3 third measurement objects and M5 fifth measurement objects, 0≤M3≤1, M5≥0, M3 and M5 are integers, the third measurement object is an NR measurement object configured on the PSCC, and the fifth measurement object is an NR measurement object configured on a frequency outside the PSCC. A processing unit is configured to calculate a CSSF outside a measurement gap MG of each measurement object in the M1 first measurement objects, the M2 second measurement objects, the M3 third measurement objects, and the M5 fifth measurement objects.

Optionally, the communication apparatus further includes a sending unit.

In some embodiments, the first measurement object meets the following conditions: A synchronization signal block SSB indicated by the first measurement object is entirely included in an active bandwidth part BWP of the terminal device; and synchronization signal block measurement timing configuration SMTC included in the first measurement object is not covered by the MG, or is partially covered by the MG.

In some embodiments, an SSB indicated by the second measurement object is entirely included in an active BWP of the terminal device, and SMTC included in the second measurement object is not covered by the MG, or is partially covered by the MG.

In some embodiments, an SSB indicated by the third measurement object is entirely included in an active BWP of the terminal device, or an active downlink BWP is an initial BWP, and SMTC included in the third measurement object is not covered by the MG, or is partially covered by the MG.

In some embodiments, an SSB indicated by the fifth measurement object is entirely included in an active BWP of the terminal device, and SMTC included in the fifth measurement object is not covered by the MG, or is partially covered by the MG.

In some embodiments, the processing unit is configured to: learn, through calculation, that a CSSF of the first measurement object is equal to 100/(100−M3*X)*(M1+M2+M5), learn, through calculation, that a CSSF of the second measurement object is equal to 100/(100−M3*X)*(M1+M2+M5), learn, through calculation, that a CSSF of the third measurement object is equal to 100/X, and learn, through calculation, that a CSSF of the fifth measurement object is equal to 100/(100−M3*X)*(M1+M2+M5), where 0<X<100.

In some embodiments, the processing unit is configured to: learn, through calculation, that a CSSF of the first measurement object is equal to 100/Y, learn, through calculation, that a CSSF of the second measurement object is equal to 100/(100−M3*X−M1*Y)*(M2+M5), learn, through calculation, that a CSSF of the third measurement object is equal to 100/X, and learn, through calculation, that a CSSF of the fifth measurement object is equal to 100/(100−M3*X−M1*Y)*(M2+M5), where 0<X<100, 0<Y<100, and 0<X+Y<100.

In some embodiments, the processing unit is configured to: learn, through calculation, that a CSSF of the first measurement object is equal to 100/Y*(M1+M2), learn, through calculation, that a CSSF of the second measurement object is equal to 100/Y*(M1+M2), and learn, through calculation, that a CSSF of the third measurement object is equal to 100/X; and in response to M1=0 and M2=0, learn, through calculation, that a CSSF of the fifth measurement object is equal to 100/(100−M3*X)*M5, or otherwise, the CSSF of the fifth measurement object is equal to 100/(100−M3*X−Y)*M5, where 0<X<100, 0<Y<100, and 0<X+Y<100.

In some embodiments, the processing unit is configured to: in response to M2=0, learn, through calculation, that a CSSF of the first measurement object is equal to 100/(100−M3*X)*(M1+M5), or otherwise, the CSSF is equal to 100/(100−M3*X−Y)*(M1+M5), learn, through calculation, that a CSSF of the second measurement object is equal to 100/Y*M2, learn, through calculation, that a CSSF of the third measurement object is equal to 100/X, and learn, through calculation, that a CSSF of the fifth measurement object is 100/(100−M3*X)*(M1+M5), or otherwise, the CSSF is equal to 100/(100−M3*X−Y)*(M1+M5), where 0<X<100, 0<Y<100, and 0<X+Y<100.

In some embodiments, the processing unit is configured to: learn, through calculation, that a CSSF of the first measurement object is equal to M1+M2+M3+M5, learn, through calculation, that a CSSF of the second measurement object is equal to M1+M2+M3+M5, learn, through calculation, that a CSSF of the third measurement object is equal to M1+M2+M3+M5, and learn, through calculation, that a CSSF of the fifth measurement object is equal to M1+M2+M3+M5.

For technical effects brought by the implementations of some embodiments, refer to descriptions of technical effects of a method side in the method embodiments or the implementations of the device or system embodiments. Details are not described herein again.

Some embodiments provide a terminal device, including a processor, a memory, and a transceiver. The memory is configured to store a computer program, and the processor is configured to: invoke and run the computer program stored in the memory, and control the transceiver to send or receive a signal, so that the terminal device performs the method in some embodiments.

Some embodiments provide a computer-readable storage medium. The computer-readable storage medium stores computer instructions. In response to the computer instructions being run on a computer, the method in some embodiments is performed.

Some embodiments provide a computer program product. The computer program product includes computer program code. In response to the computer program code being run on a computer, the method in some embodiments is performed.

Some embodiments provide a communication apparatus, including a processor and a communication interface. The communication interface is configured to receive a signal and transmit the signal to a processor, and the processor processes the signal, so that the method in some embodiments is performed.

Some embodiments provide a wireless communication system, including the terminal device.

DESCRIPTION OF EMBODIMENTS

Figure 1:
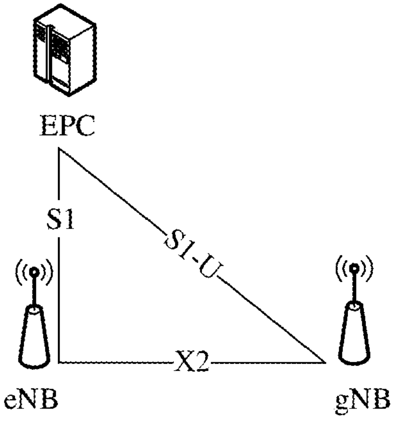
FIG. 1 is a schematic diagram of a possible application scenario EN-DC in accordance with some embodiments.

The following describes technical solutions of the embodiments with reference to the accompanying drawings.

Technical solutions in the embodiments are applied to various communication systems, for example, a fifth generation (5th generation, 5G) system such as a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS) system, or a new radio (new radio, NR) system, a satellite communication system, and another evolved communication system in the future.

In some embodiments, a network device is any device that has a wireless receiving/transmitting function. The network device includes but is not limited to an evolved NodeB (evolved NodeB, eNB), a radio network controller (radio network controller, RNC), a NodeB (NodeB, NB), a home evolved NodeB (for example, home evolved NodeB, or home NodeB, HNB), a baseband unit (baseband unit, BBU), an access point (access point, AP) in a wireless fidelity (wireless fidelity, WIFI) system, a radio relay node, a wireless backhaul node, a transmission point (transmission point, TP), a transmission and reception point (transmission and reception point, TRP), or the like; is a gNB or a transmission point (TRP or TP) in a 5G (for example, NR) system or one antenna panel or a group of antenna panels (including a plurality of antenna panels) of a base station in a 5G system; or is a network node constituting a gNB or a transmission point, such as a baseband unit (BBU) or a distributed unit (distributed unit, DU). The network device in some embodiments further is referred to as an access network device.

The network device provides a service for a cell, and the terminal device communicates with the cell by using a transmission resource (for example, a frequency domain resource or a spectrum resource) allocated by the network device. The cell belongs to a macro base station (for example, a macro eNB or a macro gNB), or belongs to a base station corresponding to a small cell (small cell). The small cell herein includes a metro cell (metrocell), a micro cell (microcell), a pico cell (picocell), a femto cell (femtocell), and the like. These small cells are characterized by small coverage and low transmit power, and are suitable for providing a high-rate data transmission service.

In some embodiments, the terminal device further is referred to as user equipment (user equipment, UE), an access terminal, a subscriber unit, a subscriber station, a mobile station, a remote station, a remote terminal, a mobile device, a user terminal, a terminal, a wireless communication device, a user agent, a user apparatus, or the like. The terminal device in some embodiments are a mobile phone (mobile phone), a tablet computer (pad), a computer with a wireless receiving/transmitting function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless telephone line, a session initiation protocol (session initiation protocol, SIP) phone, a wireless local loop (wireless local loop, WLL) station, a personal digital assistant (personal digital assistant, PDA), a handheld computing device with a wireless communication function, a computing device or another processing device connected to a wireless modem, a vehicle-mounted device, a wearable device, a terminal device in a 5G network, a terminal device in a non-public network, and the like.

The wearable device further is referred to as a wearable intelligent device, and is a general term of wearable devices, such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not a hardware device, but further implements a powerful function through software support, data interaction, and cloud interaction. In a board sense, wearable intelligent devices include full-featured and large-sized devices that implements complete or partial functions without depending on smartphones, such as smart watches or smart glasses, and devices that dedicated to one type of application function and works with other devices such as smartphones, such as various smart bands or smart jewelry for monitoring physical signs.

In addition, the terminal device alternatively is a terminal device in an internet of things (internet of things, IoT) system. The IoT is an part of development of an information technology in the future. A main technical feature of the IoT is an intelligent network in which things are connected to a network by using a communication technology, to implement man-computer interconnection and interconnection between things.

An overall architecture of a 5G wireless communication system includes a 5GC (further referred to as 5GCore, 5GCN, or a 5G core network) and an NG-RAN (further referred to as a 5G-RAN). The 5GC is a core network of the 5G wireless communication system, and the NG-RAN is a radio access network (radio access network, RAN) of the 5G wireless communication system. The NG-RAN includes two types of RAN nodes: a gNB and an ng-eNB. The gNB provides terminations (terminations) of a user plane protocol stack and a control plane protocol stack of new radio (new radio, NR) for the terminal device. The ng-eNB provides terminations of a user plane protocol stack and a control plane protocol stack of evolved universal terrestrial radio access (evolved universal terrestrial radio access, E-UTRA).

FIG. 1 is a schematic diagram of a possible application scenario EN-DC in accordance with some embodiments.

In a deployment scenario of EN-DC (E-UTRANR dual connectivity), a core network is an evolved packet core (evolved packet core, EPC) network, an LTE eNodeB (for example, an ng-eNB) is used as a primary base station, an NR eNodeB (for example, a gNB) is used as a secondary base station to perform dual connectivity (dual connectivity, DC), and both the primary base station and the secondary base station are connected to the EPC. There is an X2 interface between the LTE eNodeB and the NR eNodeB, there is at least a control plane connection, and there further is a user plane connection; there is an S1 interface between the LTE eNodeB and the EPC, there is at least a control plane connection, and there further is a user plane connection; and there is an S1-U interface between the NR eNodeB and the EPC, that is, there is a user plane connection. The LTE eNodeB provides an air interface resource for UE by using at least one LTE cell. In this case, the at least one LTE cell is referred to as a master cell group (master cell group, MCG). Correspondingly, the NR eNodeB further provides an air interface resource for the UE by using at least one NR cell. In this case, the at least one NR cell is referred to as a secondary cell group (secondary cell group, SCG).

Figure 2:
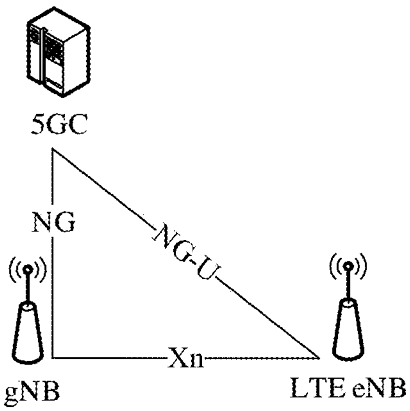
FIG. 2 is a schematic diagram of a possible application scenario NR-DC in accordance with some embodiments.

FIG. 2 is a schematic diagram of a possible application scenario NR-DC in accordance with some embodiments.

In a deployment scenario of NR-DC (or referred to as NR-NRDC), both a primary base station and a secondary base station are NR eNodeBs (for example, gNBs), and both are connected to a 5GC. There is a control plane connection or a data plane connection between an NR eNodeB used as the primary base station and the 5GC, and there is a data plane connection between an NR eNodeB used as the secondary base station and the 5GC. Both the primary base station and the secondary base station provides an air interface transmission resource for data transmission between the terminal device and the 5GC.

Figure 3:
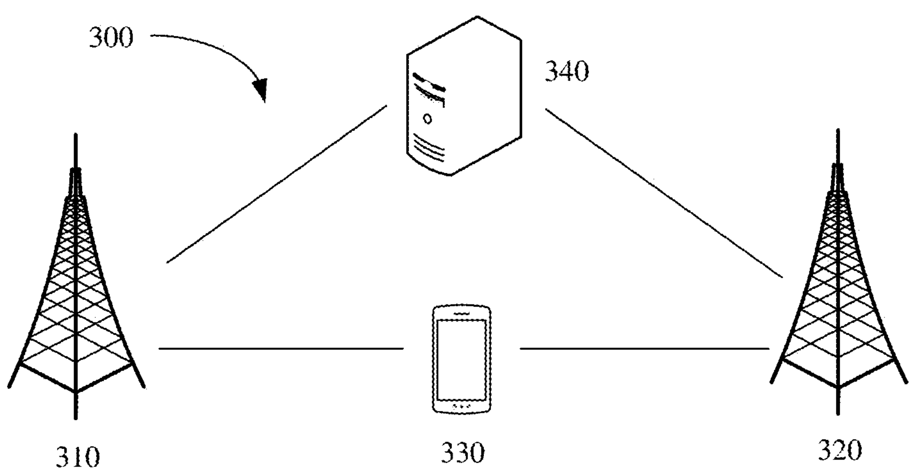
FIG. 3 is a schematic diagram of a communication system in accordance with some embodiments.

FIG. 3 is a schematic diagram of a communication system applicable to a communication method and a communication apparatus in accordance with some embodiments. As shown in FIG. 3, a communication system 300 includes at least one network device, for example, a network device 310 and a network device 320 shown in FIG. 3. The communication system 300 further includes at least one terminal device, for example, a terminal device 330 shown in FIG. 3. The terminal device 330 is mobile or fixed. Both the network device 310 and the network device 320 are devices that communicates with the terminal device 330 by using a radio link, such as base stations or base station controllers. Each network device provides communication coverage for a geographical area, and communicates with a terminal device located in this coverage area (cell). The wireless communication system 300 further includes at least one core network, for example, a core network 330 shown in FIG. 3. The core network 330 is a 4G core network, a 5G core network, or the like.

A dual-connectivity architecture of the foregoing deployment scenario is formed between the core network 330 and the terminal device 330. For example, the network device 310 is an LTE eNodeB used as a primary base station, the network device 320 is an NR eNodeB used as a secondary base station, the core network 330 is a 3G core network EPC, there are a control plane connection and a data plane connection between the network device 310 and the core network 330, there is a data plane connection between the network device 320 and the core network 330, and both the network device 310 and the network device 320 provide an air interface transmission resource for data transmission between the terminal device 330 and the core network 330. In other words, the dual-connectivity deployment scenario shown in FIG. 1 is formed. In this case, the network device 310 corresponds to the LTE eNB shown in FIG. 1, the network device 320 corresponds to the gNB shown in FIG. 1, and the core network corresponds to the EPC shown in FIG. 1.

FIG. 3 shows two network devices and one terminal device as an example. However, this does not limit the embodiments. Optionally, the communication system 300 includes more network devices, and coverage of each network device includes another quantity of terminal devices. Optionally, the communication system 300 further includes a plurality of core network devices. This is not limited.

A plurality of antennas are configured for the foregoing communication devices, such as the network device 310, the network device 320, or the terminal device 330 in FIG. 3. The plurality of antennas includes at least one transmit antenna used to send a signal and at least one receive antenna used to receive a signal. In addition, each communication device additionally includes a transmitter chain and a receiver chain. A person of ordinary skill in the art understands that each of the transmitter chain and the receiver chain includes a plurality of components (for example, a processor, a modulator, a multiplexer, a demodulator, a demultiplexer, or an antenna) related to signal sending and receiving. Therefore, the network device communicates with the terminal device by using a multi-antenna technology.

Optionally, the wireless communication system 300 further includes another network entity such as a network controller or a mobility management entity. This embodiment is not limited thereto.

To facilitate understanding of the embodiments, terms involved are described.

1. A special cell (special cell, SpCell) includes a primary cell (primary cell, PCell) and/or a primary secondary cell (primary secondary cell, PSCell).

2. Synchronization signal block (synchronization signal block, SSB)-based NR intra-frequency measurement: For SSB-based measurement configured on a to-be-measured NR frequency by an NR SpCell, in response to an SSB on the to-be-measured NR frequency being the same as an SSB of a serving cell in terms of a center frequency and a subcarrier spacing (subcarrier spacing, SCS), the measurement is described as intra-frequency measurement.

3. SSB-based NR inter-frequency measurement: For SSB-based measurement configured on a to-be-measured NR frequency by an NR SpCell, in response to an SSB on the to-be-measured NR frequency being different from an SSB of a serving cell in terms of a center frequency or an SCS, the measurement is described as inter-frequency measurement.

4. NR inter-system measurement: In an EN-DC scenario, measurement configured on a to-be-measured NR frequency by a PCell of an LTE eNodeB is referred to as NR inter-system measurement.

In some embodiments, in the NR-DC scenario, both a primary base station and a secondary base station are NR eNodeBs, and therefore, there is no inter-system measurement.

5. Service frequency: A frequency at which a serving cell is located is referred to as a service frequency.

6. A special component carrier (special component carrier, SpCC) includes a primary component carrier (primary component carrier, PCC) and/or a primary secondary component carrier (primary secondary component carrier, PSCC).

7. Carrier aggregation (carrier aggregation, CA): A plurality of carriers distributed on a plurality of bands are aggregated to form higher bandwidth, to improve a peak throughput of UE. An aggregated carrier includes one PCC and one or more secondary component carriers (secondary composition carrier, SCC). The PCC corresponds to the PCell, the PSCC corresponds to the PSCell, and the SCC corresponds to the SCell.

8. NR service frequency inter-system measurement: In the EN-DC scenario, measurement configured on an NR service frequency by the PCell of the LTE eNodeB is referred to as NR service frequency inter-system measurement. As an example instead of a limitation in some embodiments service frequency inter-system measurement is referred to as service frequency inter-system measurement.

9. NR non-service frequency inter-system measurement: In the EN-DC scenario, measurement configured on another NR frequency of a non-NR service frequency by the PCell of the LTE eNodeB is referred to as NR service frequency inter-system measurement. As an example instead of a limitation in some embodiments service frequency inter-system measurement is referred to as service frequency inter-system measurement.

In a cellular communication system, a mobility management function is one of the most functions. Mobility management is performed based on mobility measurement. A network device sends measurement configuration to UE by using dedicated signaling, to indicate the UE to perform mobility measurement at some frequencies. The UE performs measurement based on the measurement configuration and reports a measurement result to the network device. The network device sends a corresponding indication based on the measurement result of the UE, and the UE determines to perform various mobility processes according to the indication of the network device.

Because a to-be-measured frequency configured on a network device side does not fall within current operating bandwidth of the UE, a relationship between mobility measurement and data receiving/sending is coordinated during mobility measurement. In response to the UE performing measurement at a frequency outside the operating bandwidth, the following two method are used:

In a first method, in response to the UE having no idle radio frequency (radio frequency, RF) channel (channel), the UE implements measurement by adjusting a parameter (for example, a center frequency or bandwidth) of a working RF channel, and after completing measurement, adjusts the RF channel back to a parameter used before measurement, to continue data receiving/sending.

In a second method, in response to the UE having an idle radio frequency channel (RF channel), the UE performs measurement by using the idle radio frequency channel.

In the first method, in a period of time from the UE adjusts the parameter of the RF channel to performing measurement to adjusting the parameter of the RF channel to the original parameter of the RF channel, original data receiving/sending of the UE is unable to be performed.

The second method depends on a software and hardware capability of the UE, because a complete radio frequency channel is supported by a complete set of resources such as a radio frequency, a baseband, and a software protocol stack. Out of consideration of costs, a quantity of radio frequency channels supported by the UE is limited.

In an LTE protocol, there are corresponding supporting mechanisms for both the foregoing two methods.

For the first method, LTE supports a measurement gap (measurement gap, MG). The measurement gap is a time interval that is agreed on by the network device and the UE and that is exclusively used for measurement. In this period of time, because the network device has agreed not to call for the UE to perform receiving/sending, the UE concentrates on measurement, and does not send or receive data. The MG is a mechanism in which data receiving/sending and mobility measurement are performed at different times.

In the second method, the LTE supports needForGap capability reporting. The needForGap capability reporting means that in response to a capability of the UE ensures that on a band (band) or band combination (band combination, BC), there is an idle radio frequency channel used for mobility measurement, the UE reports that inter-frequency or inter-system measurement of the UE on a carrier of the band or the BC does not support by the MG (that is, gap-less measurement).

However, for NR, needForGap reporting is performed on a per band or BC basis. In response to the UE supporting many bands or BCs, huge signaling overheads are caused. Therefore, an NR protocol does not support the needForGap capability reporting. Measurement that is on the band or the BC and that is supported by the MG or that does not support by the MG is directly specified in the protocol.

Currently, gap-less measurement described in the NR protocol includes:

1. For SSB-based NR intra-frequency measurement, in response to the following two conditions being met, support from the MG is not called for.

(a) SSB measurement timing configuration (SSB measurement timing configuration, SMTC) partially overlaps the MG or completely does not overlap the MG.

(b) An active bandwidth part (bandwidth part, BWP) is an initial BWP, or the currently active BWP is not an initial BWP, but an SSB in intra-frequency measurement is entirely included in the active BWP.

2. For SSB-based NR inter-system measurement configured on an NR service frequency by an E-UTRAN PCell in EN-DC, as described in LTE 36.133, the NR inter-system measurement uses a delay indicator of NR intra-frequency measurement specified in NR 38.133. This means that inter-system measurement that is configured on the NR service frequency and that meets the following conditions does not receive support from the MG.

(a) SMTC partially overlaps the MG or completely does not overlap the MG.

(b) An SSB in the inter-system measurement is entirely included in an active BWP.

3. In R16, RAN4 agrees that NR inter-frequency measurement that meets the following conditions is unable to receive support from the MG.

(a) SMTC partially overlaps the MG or completely does not overlap the MG.

(b) An SSB in the inter-frequency measurement is entirely included in an active BWP.

As an example instead of a limitation, the foregoing three types of gap-less measurement are respectively referred to as "gap-less intra-frequency measurement", "gap-less service frequency inter-system measurement", and "gap-less inter-frequency measurement" in some embodiments.

In the NR 38.133, a single-frequency delay indicator and a precision indicator of mobility measurement are described for each of the foregoing types of measurement.

1. The precision indicator is an upper limit of a deviation between a measurement result reported by the UE and an value.

The precision indicator is determined by a condition. In response to measurement precision being excessively low, the network device is misled to make a wrong decision. Therefore, the precision indicator depends on a tolerable error of the network device.

2. The delay indicator is an upper limit of a deviation between a measurement result reported by the UE and an value.

The delay indicator is indirectly determined by the precision indicator. Generally, a measurement result of the indicator obtained based on a single SSB is not precise enough due to impact from interference and noise. The UE averages (referred to as layer-1 filtering) a plurality of measurement results (that is, measurement samples) obtained based on one SSB, to ensure that precision meets an indicator condition. At a software and hardware level, a quantity of measurement samples called for to meet a precision condition is fixed. Therefore, the delay indicator is represented as follows:

Delay indicator=Quantity of samples called for to meet a condition of the precision indicator*Time called for to obtain a single sample.

In some embodiments, * indicates that a multiplication operation is performed. For example, A*B indicates that the multiplication operation is performed on A and B.

In some embodiments, the delay indicator is described for measurement of a single frequency, and mutual impact between a plurality of frequencies is not taken into consideration. Actually, in response to the network device configuring measurement of a plurality of frequencies for the UE, there is a problem that the plurality of frequencies preempt a measurement opportunity. Due to a limitation of the software and hardware capability, a quantity of measurements that is performed in parallel by the UE is limited. Once a quantity of gap-less measurements configured by the network device for the UE exceeds the capability of the UE, the UE performs measurements at different times.

For measurement of each frequency, time division inevitably leads to an increase in time used for collecting a called for measurement sample. Therefore, in some embodiments, to extend a measurement delay indicator in an equal proportion is reasonable. Herein, a concept of a carrier specific scaling factor (carrier specific scaling factor, CSSF) is introduced; a scaling factor CSSF is multiplied based on a delay indicator of an original single carrier.

A relationship between an NR intra-frequency measurement delay indicator $T_{SSB\_measurement\_period\_intra}$ and $CSSF_{intra}$ is shown in Table 1. Table 1 shows relationships between the delay indicator $T_{SSB\_measurement\_period\_intra}$ and $CSSF_{intra}$ in response to there being no discontinuous reception (discontinuous Reception) DRX, in response to a DRX cycle (cycle) being ≤320 ms, and in response to a DRX cycle being >320 ms. $K_p$ is a relaxation factor for compensating for collision between the SMTC and the MG, ceil( ) is a rounding function, $CSSF_{intra}$ is CSSFs of intra-frequency measurement corresponding to different DRX cycles, and a remaining part is a single-carrier measurement delay in different cases.

In some embodiments, in response to different SMTC periods being used for different cells, the SMTC period in the table means an SMTC period used during cell identification.

TABLE 1

| DRX cycle | $T_{SSB\_measurement\_period\_intra}$ |
|---|---|
| Non-DRX | max(200 ms, ceil(5 * $K_p$) * SMTC period) * $CSSF_{intra}$ |
| DRX cycle ≤ 320 ms | max(200 ms, ceil(1.5 * 5 * $K_p$) * max(SMTC period, DRX cycle)) * $CSSF_{intra}$ |
| DRX cycle > 320 ms | ceil(5 * $K_p$) * DRX cycle * $CSSF_{intra}$ |

In the NR 38.133, measurement types are classified into two groups based on whether measurement receives support from the MG. measurements that receives support the MG participate in calculation of a CSSF within MG ($CSSF_{within\_gap}$), and gap-less measurements participate in calculation of a CSSF outside MG ($CSSF_{outside\_gap}$). More a method for calculating $CSSF_{outside\_gap}$ in the protocol is designed based on a RAN4 baseline assumption. RAN4 baseline assumptions include:

1. In some embodiments, software and hardware resources of the UE support parallel execution of at most two gap-less NR measurements, and one software and hardware resource that supports the gap-less NR measurement is referred to as one searcher (searcher). In response to the software and hardware resources of the UE supporting parallel execution of two gap-less NR measurements, this indicates that there are two searchers, and the two searchers are denoted as a searcher #1 and a searcher #2.

2. In the two searchers, the searcher #1 is exclusively used for gap-less intra-frequency measurement in an NR SpCC.

In some embodiments, the NR SpCC herein is an NR PSCC in EN-DC, and is an NR PCC in NR-DC.

3. The searcher #2 is allocated between other gap-less measurement types, and allocation manners include:

(a) In NR-DC, gap-less intra-frequency measurement in the NR PSCC fixedly obtains half of measurement opportunities of the searcher #2.

(b) In response to the network device configuring an FR2 SCC for the UE, and the UE measures a neighboring cell on the SCC, gap-less intra-frequency measurement on the SCC fixedly obtains half of measurement opportunities of the searcher #2.

A frequency range of 5G NR is separately described as different FRs: an FR1 and an FR2. A corresponding band range of the FR1 includes 450 MHz to 6000 MHz (which is further referred to as a sub-6 GHz band), and a corresponding band range of the FR2 includes 24250 MHz to 52600 MHz (which is further referred to as an above-6 GHz band or a millimeter wave band).

In some embodiments, in the EN-DC scenario, in response to the network device configuring an FR2 SCC for the UE and a PSCell is in the FR1, the UE measures a neighboring cell in the FR2 SCC.

(c) In R15, remaining measurement opportunities on the searcher #2 are equally divided by gap-less intra-frequency measurement on SCCs that do not call for neighboring cell measurement.

In some embodiments, the SCCs that do not call for neighboring cell measurement include FR1 SCCs and an FR2 SCC that does not call for neighboring cell measurement.

In some embodiments, in R16, the remaining measurement opportunities on the searcher #2 are equally divided by gap-less intra-frequency measurement and gap-less inter-frequency measurement on FR2 SCCs that do not call for neighboring cell measurement.

Based on the foregoing allocation method, a CSSF corresponding to measurement on each carrier is determined, and the CSSF is equal to a reciprocal of a measurement opportunity proportion obtained based on the foregoing assumptions. For example, in the allocation manner (b), the UE measures a neighboring cell on the SCC, and in this case, gap-less intra-frequency measurement on the SCC obtains half of the measurement opportunities of the searcher #2, that is, ½ of the opportunities, and a CSSF corresponding to measurement on this carrier is equal to 2.

Table 2 shows $CSSF_{outside\_gap}$ of various types of gap-less measurements in EN-DC in the NR 38.133. In some embodiments, for intra-band (intra-band) EN-DC of FR1+FR2, there is a BC with one FR1 band and one FR2 band.

objects, M1≥0, M2≥0, M1 and M2 are integers, the first measurement object is an NR measurement object configured on a primary secondary component carrier PSCC or a secondary component carrier SCC, and the second measurement object is an NR measurement object configured on a frequency outside the PSCC and the SCC.

The first measurement object meets the following conditions:

A synchronization signal block SSB indicated by the first measurement object is entirely included in an active bandwidth part BWP of the terminal device, and synchronization signal block measurement timing configuration SMTC included in the first measurement object is not covered by an MG, or is partially covered by the MG.

The second measurement object meets the following conditions:

An SSB indicated by the second measurement object is entirely included in an active BWP of the terminal device; and SMTC included in the second measurement object is not covered by the MG, or is partially covered by the MG.

The first configuration information includes gap-less service frequency inter-system measurement performed on the M1 first measurement objects and gap-less non-service frequency inter-system measurement performed on the M2 second measurement objects.

TABLE 2

| EN-DC scenario | $CSSF_{outside\_gap,i}$ of an FR1 PSCC | $CSSF_{outside\_gap,i}$ of an FR1 SCC | $CSSF_{outside\_gap,i}$ of an FR2 PSCC | $CSSF_{outside\_gap,i}$ of an FR2 SCC that calls for neighboring cell measurement | $CSSF_{outside\_gap,i}$ of an FR2 SCC that does not call for neighboring cell measurement |
|---|---|---|---|---|---|
| There is an FR1 NR serving cell | 1 | Quantity of configured FR1 SCells | N/A | N/A | N/A |
| There are intra-band FR2 NR serving cells | N/A | N/A | 1 | N/A | Quantity of configured FR2 SCells |
| There are an FR1 NR serving cell an FR2 NR serving cell, and a PSCell in an FR1 | 1 | 2 * (Quantity of configured SCells − 1) | N/A | 2 | 2 * (Quantity of configured SCells − 1) |
| There are an FR1 NR serving cell an FR2 NR serving cell, and a PSCell in an FR2 | N/A | Quantity of configured SCells | 1 | N/A | Quantity of configured SCells |

In the LTE 36.133, the NR inter-system measurement configured on an NR service frequency by an LTE PCell in EN-DC is applicable to a delay indicator of NR intra-frequency measurement described in the NR 38.133. However, intra-frequency measurement is considered in calculation of $CSSF_{outside\_gap}$ shown in Table 2 (gap-less inter-frequency measurement is further considered for R16). UE strictly implemented based on a protocol in this way is unable to report a measurement result of gap-less inter-system measurement within a measurement delay.

Some embodiments provide a method for calculating a carrier specific scaling factor, to correspondingly correct calculation of a CSSF. As an example instead of a limitation, in some embodiments, EN-DC is used as an example of an application scenario for description.

Figure 4:
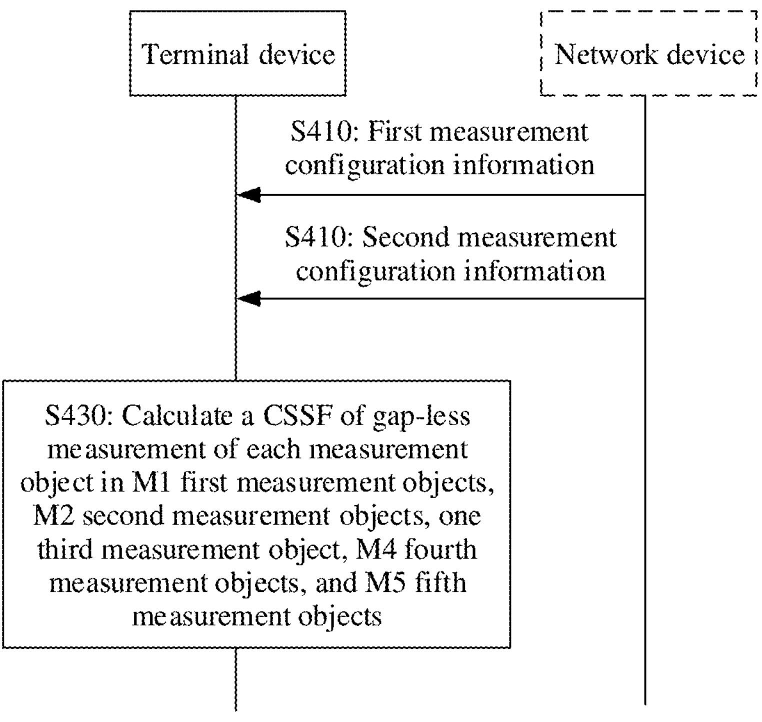
FIG. 4 shows an example of a method for calculating a carrier specific scaling factor CSSF outside a measurement gap in accordance with some embodiments.

FIG. 4 shows an example of a method for calculating a carrier specific scaling factor CSSF outside a measurement gap in accordance with some embodiments.

S410: A terminal device receives first measurement configuration information sent by an E-UTRAN primary cell.

The first measurement configuration information includes M1 first measurement objects and M2 second measurement In some embodiments, the gap-less service frequency inter-system measurement includes gap-less service frequency inter-system measurement configured on the PSCC and/or gap-less service frequency inter-system measurement configured on the SCC.

S420: The terminal device receives second measurement configuration information sent by an NR primary secondary cell.

The second measurement configuration information includes M3 third measurement objects, M4 fourth measurement objects, and M5 fifth measurement objects, 0≤M3≤1, M4≥0, M5≥0, M3, M4, and M5 are integers, the third measurement object is an NR measurement object configured on the PSCC, the fourth measurement object is an NR measurement object configured on the SCC, and the fifth measurement object is an NR measurement object configured on the frequency outside the PSCC and the SCC.

The third measurement object meets the following conditions:

An SSB indicated by the third measurement object is entirely included in an active BWP of the terminal device, or an active downlink BWP is an initial BWP; and SMTC included in the third measurement object is not covered by the MG, or is partially covered by the MG.

The fourth measurement object meets the following conditions:

An SSB indicated by the fourth measurement object is entirely included in an active BWP of the terminal device, or an active downlink BWP is an initial BWP; and SMTC included in the fourth measurement object is not covered by the MG, or is partially covered by the MG.

The fifth measurement object meets the following conditions:

An SSB indicated by the fifth measurement object is entirely included in an active BWP of the terminal device; and SMTC included in the fifth measurement object is not covered by the MG, or is partially covered by the MG.

The second configuration information includes: performing gap-less PSCC intra-frequency measurement on the M3 third measurement objects, performing gap-less SCC intra-frequency measurement on the M4 third measurement objects, and performing gap-less inter-frequency measurement on the M5 fifth measurement objects.

S430: The terminal device calculates a CSSF of gap-less measurement of each measurement object in the M1 first measurement objects, the M2 second measurement objects, the M3 third measurement objects, the M4 fourth measurement objects, and the M5 fifth measurement objects.

How to allocate a measurement opportunity of a searcher and calculate $CSSF_{outside\_gap}$ corresponding to each measurement object is not described herein, and is described in detail in the following embodiments.

intra-frequency measurement, gap-less service frequency inter-system measurement, gap-less non-service frequency inter-system measurement, and gap-less inter-frequency measurement on SCCs that do not call for neighboring cell measurement.

In some embodiments, a quantity of NR frequencies that are configured by the network device for the UE and that call for PSCC intra-frequency measurement is 1 (that is, an example in the M3 third measurement objects), N1 is a quantity of NR frequencies that are configured by the network device for the UE and that call for SCC intra-frequency measurement (that is, an example in the M4 fourth measurement objects), and N2 is a quantity of NR frequencies that are configured by the network device for the UE and that call for gap-less service frequency inter-system measurement (that is, an example in the M1 first measurement objects); in response to the UE supporting gap-less non-service frequency inter-system measurement, N3 is a quantity of NR frequencies that are configured by the network device for the UE and that call for gap-less non-service frequency inter-system measurement, or otherwise, N3=0 (that is, an example in the M2 second measurement objects); and in response to the UE supporting gap-less inter-frequency measurement, N4 is a quantity of NR frequencies that are configured by the network device for the UE and that call for gap-less inter-frequency measurement, or otherwise, N4=0 (that is, an example in the M5 fifth measurement objects).

$CSSF_{outside\_gap}$ corresponding to a measurement type of each frequency in this embodiment is shown in Table 3.

TABLE 3

| EN-DC scenario | PSCC intra-frequency | SCC intra-frequency that does not call for neighboring cell measurement | FR2 SCC intra-frequency that calls for neighboring cell measurement | Service frequency inter-system | Non-service frequency inter-system | Inter-frequency |
|---|---|---|---|---|---|---|
| There is an FR1 NR serving cell | 1 | N1 + N2 + N3 + N4 | N/A | N1 + N2 + N3 + N4 | N1 + N2 + N3 + N4 | N1 + N2 + N3 + N4 |
| There are intra-band FR2 NR serving cells | 1 | N1 + N2 + N3 + N4 | N/A | N1 + N2 + N3 + N4 | N1 + N2 + N3 + N4 | N1 + N2 + N3 + N4 |
| There are FR1 + FR2 NR serving cells, and a PSCell in an FR1 | 1 | 2(N1 + N2 + N3 + N4 − 1) | 2 | 2(N1 + N2 + N3 + N4 − 1) | 2(N1 + N2 + N3 + N4 − 1) | 2(N1 + N2 + N3 + N4 − 1) |
| There are FR1 + FR2 NR serving cells, and a PSCell in an FR2 | 1 | N1 + N2 + N3 + N4 | N/A | N1 + N2 + N3 + N4 | N1 + N2 + N3 + N4 | N1 + N2 + N3 + N4 |

An example of a method for calculating a carrier specific scaling factor in an EN-DC scenario is provided below.

UE allocates a searcher between measurements at frequencies based on the following baseline assumptions:

1. In some embodiments, the UE includes a searcher #1 and a searcher #2.

2. In response to a network device configuring gap-less intra-frequency measurement on the PSCC for the UE, the searcher #1 is exclusively used for gap-less intra-frequency measurement on an NR PSCC.

3. In response to the network device configuring an FR2 SCC for the UE, and the UE measures a neighboring cell at a frequency corresponding to the SCC, gap-less intra-frequency measurement on the SCC fixedly obtains half of measurement opportunities of the searcher #2. In this case, $CSSF_{outside\_gap}$ of the gap-less intra-frequency measurement on the SCC is equal to 2.

4. In an embodiment, remaining measurement opportunities of the searcher #2 are equally divided by gap-less intra-frequency measurement, gap-less service frequency inter-system measurement, gap-less non-service frequency inter-system measurement, and gap-less inter-frequency measurement on SCCs that do not call for neighboring cell measurement.

In some embodiments, $CSSF_{outside\_gap}$, is equal to a reciprocal of a measurement opportunity proportion obtained based on the foregoing assumptions. For example, in a scenario in which there is an FR1 NR serving cell corresponding to Table 3, measurement opportunities of the searcher #2 are equally divided by a gap-less intra-frequency measurement frequency, a gap-less service frequency inter-system measurement frequency, a gap-less non-service frequency inter-system frequency, and a gap-less inter-frequency measurement frequency on SCCs that does not call for neighboring cell measurement, that is, $CSSF_{outside\_gap}$ of the foregoing four measurement types corresponding to each frequency except PSCC intra-frequency measurement is 1/(100%*(1/N1+N2+N3+N4)).

4. In another embodiment, gap-less service frequency inter-system measurements obtain X % of the measurement opportunities of the searcher #2.

Optionally, X is a fixed value specified in a protocol, and 0<X<100, for example, X %=25% or 50%.

Optionally, the network device notifies the terminal device of the used allocation proportion X % of the searcher by sending system information (system information, SI) or an RRC message.

Optionally, the network device notifies the terminal device of a set of candidate search resource allocation proportions by sending SI or an RRC message, and then notify the terminal device of one X % of candidate values by using signaling.

In some embodiments, in response to NR serving cells being separately located in the FR1 and the FR2, and a primary secondary cell is located in the FR1, 0<X<50.

5. Remaining measurement opportunities of the searcher #2 are equally divided by gap-less intra-frequency measurement, gap-less non-service frequency inter-system measurement, and gap-less inter-frequency measurement on SCCs that do not call for neighboring cell measurement.

$CSSF_{outside\_gap}$ corresponding to each measurement type in this embodiment is shown in Table 4.

TABLE 4

| EN-DC scenario | PSCC intra-frequency | SCC intra-frequency that does not call for neighboring cell measurement | FR2 SCC intra-frequency that calls for neighboring cell measurement | Service frequency inter-system | Non-service frequency inter-system | Inter-frequency |
|---|---|---|---|---|---|---|
| There is an FR1 NR serving cell | 1 | 100/(100 − X) * (N1+ N3 + N4) | N/A | 100/X * N2 | 100/(100 − X) * (N1 + N3 + N4) | 100/(100 − X) * (N1 + N3 + N4) |
| There are intra-band FR2 NR serving cells | 1 | 100/(100 − X) * (N1 + N3 + N4) | N/A | 100/X * N2 | 100/(100 − X) * (N1 + N3 + N4) | 100/(100 − X) * (N1 + N3 + N4) |
| There are FR1 + FR2 NR serving cells, and a PSCell in an FR1 | 1 | 100/(50 − X) * (N1 + N3 + N4 − 1) | 2 | 100/X * N2 | 100/(50 − X) * (N1 + N3 + N4 − 1) | 100/(50 − X) * (N1 + N3 + N4 − 1) |
| There are FR1 + FR2 NR serving cells, and a PSCell in an FR2 | 1 | 100/(100 − X) * (N1 + N3 + N4) | N/A | 100/X * N2 | 100/(100 − X) * (N1 + N3 + N4) | 100/(100 − X) * (N1 + N3 + N4) |

4. In another embodiment, gap-less inter-system measurements (that is, gap-less service frequency inter-system measurements and gap-less non-service frequency inter-system measurements) obtain X % of the measurement opportunities of the searcher #2.

Optionally, X is a fixed value specified in a protocol, and 0<X<100, for example, X %=25% or 50%.

Optionally, the network device notifies the terminal device of the used allocation proportion X % of the searcher by sending system information (system information, SI) or an RRC message.

Optionally, the network device notifies the terminal device of a set of candidate search resource allocation proportions by sending SI or an RRC message, and then notify the terminal device of one X % of candidate values by using signaling.

In some embodiments, in response to NR serving cells being separately located in the FR1 and the FR2, and a primary secondary cell is located in the FR1, 0<X<50.

5. Remaining measurement opportunities of the searcher #2 are equally divided by gap-less intra-frequency measurement and gap-less inter-frequency measurement on SCCs that do not call for neighboring cell measurement.

$CSSF_{outside\_gap}$ corresponding to each measurement type in this embodiment is shown in Table 5.

TABLE 5

| EN-DC scenario | PSCC intra-frequency | SCC intra-frequency that does not call for neighboring cell measurement | FR2 SCC intra-frequency that calls for neighboring cell measurement | Service frequency inter-system | Non-service frequency inter-system | Inter-frequency |
|---|---|---|---|---|---|---|
| There is an FR1 NR serving cell | 1 | 100/(100 − X) * (N1 + N4) | N/A | 100/X * (N2 + N3) | 100/X * (N2 + N3) | 100/(100 − X) * (N1 + N4) |
| There are intra-band FR2 NR serving cells | 1 | 100/(100 − X) * (N1 + N4) | N/A | 100/X * (N2 + N3) | 100/X * (N2 + N3) | 100/(100 − X) * (N1 + N4) |
| There are FR1 + FR2 NR serving cells, and a PSCell in an FR1 | 1 | 100/(50 − X)(N1 + N4 − 1) | 2 | 100/X * (N2 + N3) | 100/X * (N2 + N3) | 100/(50 − X)(N1 + N4 − 1) |
| There are FR1 + FR2 NR serving cells, and a PSCell in an FR2 | 1 | 100/(100 − X) * (N1 + N4) | N/A | 100/X * (N2 + N3) | 100/X * (N2 + N3) | 100/(100 − X) * (N1 + N4) |

4. In another embodiment, gap-less non-service frequency inter-system measurements obtain X % of the measurement opportunities of the searcher #2.

Optionally, X is a fixed value specified in a protocol, and 0<X<100, for example, X %=25% or 50%.

Optionally, the network device notifies the terminal device of the used allocation proportion X % of the searcher by sending system information (system information, SI) or an RRC message.

Optionally, the network device notifies the terminal device of a set of candidate search resource allocation proportions by sending SI or an RRC message, and then notify the terminal device of one X % of candidate values by using signaling.

In some embodiments, in response to NR serving cells being separately located in the FR1 and the FR2, and a primary secondary cell is located in the FR1, 0<X<50.

5. Remaining measurement opportunities of the searcher #2 are equally divided by gap-less intra-frequency measurement, gap-less service frequency inter-system measurement, and gap-less inter-frequency measurement on SCCs that do not call for neighboring cell measurement.

$CSSF_{outside\_gap}$ corresponding to each measurement type in this embodiment is shown in Table 6.

In another embodiment, in EN-DC, the UE allocates a searcher between measurements at frequencies based on the following baseline assumptions:

1 In some embodiments, a searcher #1 and a searcher #2 are configured for the UE.

2. For gap-less service frequency inter-system measurement on a PSCC, X % of opportunities are fixedly obtained on the searcher #1.

Optionally, X is a fixed value specified in a protocol, and 0<X<100, for example, X %=25% or 50%.

Optionally, the network device notifies the terminal device of the used allocation proportion X % of the searcher by sending system information (system information, SI) or an RRC message.

Optionally, the network device notifies the terminal device of a set of candidate search resource allocation proportions by sending SI or an RRC message, and then notify the terminal device of one X % of candidate values by using signaling.

3. Gap-less intra-frequency measurement on the PSCC obtains remaining opportunities of the searcher #1.

4. Gap-less intra-frequency measurement on an FR2 SCC that calls for neighboring cell measurement obtain half of measurement opportunities of the searcher #2.

TABLE 6

| EN-DC scenario | PSCC intra-frequency | SCC intra-frequency that does not call for neighboring cell measurement | FR2 SCC intra-frequency that calls for neighboring cell measurement | Service frequency inter-system | Non-service frequency inter-system | Inter-frequency |
|---|---|---|---|---|---|---|
| There is an FR1 NR serving cell | 1 | 100/(100 − X) * (N1 + N2 + N4) | N/A | 100/(100 − X) * (N1 + N2 + N4) | 100/X * N3 | 100/(100 − X) * (N1 + N2 + N4) |
| There are intra-band FR2 NR serving cells | 1 | 100/(100 − X) * (N1 + N2 + N4) | N/A | 100/(100 − X) * (N1 + N2 + N4) | 100/X * N3 | 100/(100 − X) * (N1 + N2 + N4) |
| There are FR1 + FR2 NR serving cells, and a PSCell in an FR1 | 1 | 100/(50 − X) * (N1 + N2 + N4 − 1) | 2 | 100/(50 − X) * (N1 + N2 + N4 − 1) | 100/X * N3 | 100/(50 − X) * (N1 + N2 + N4 − 1) |
| There are FR1 + FR2 NR serving cells, and a PSCell in an FR2 | 1 | 100/(100 − X) * (N1 + N2 + N4) | N/A | 100/(100 − X) * (N1 + N2 + N4) | 100/X * N3 | 100/(100 − X) * (N1 + N2 + N4) |

In some embodiments, the terminal device allocates a corresponding measurement opportunity to gap-less inter-system measurement in the searcher #2, to reduce a delay of inter-system measurement.

5. Based on the method in the embodiment corresponding to Table 3 to Table 6, remaining measurement opportunities of the searcher #2 are allocated to gap-less service frequency inter-system measurements on the SCC and gap-less intra-frequency measurement, gap-less non-service frequency inter-system measurement, and gap-less inter-frequency measurement in SCCs that do not call for neighboring cell measurement.

In some embodiments, for $CSSF_{outside\_gap}$ corresponding to the service frequency inter-system measurement on the SCC and the gap-less intra-frequency measurement, the gap-less non-service frequency inter-system measurement, and the gap-less inter-frequency measurement in the SCCs that do not call for neighboring cell measurement, refer to Table 3 to Table 6 corresponding to the foregoing embodiments. $CSSF_{outside\_gap}$ of the service frequency inter-system measurement on the SCC in this embodiment corresponds to $CSSF_{outside\_gap}$ of the service frequency inter-system measurement in Table 3 to Table 6.

However, in some embodiments, in response to PSCC service frequency inter-system being configured, N2 in Table 3 to Table 6 replaced with N2-1, and the service frequency inter-system in Table 3 to Table 6 replaced with SCC service frequency inter-system.

Correspondingly, $CSSF_{outside\_gap}$ corresponding to PSCC intra-frequency measurement and $CSSF_{outside\_gap}$ corresponding to PSCC service frequency inter-system measurement are shown in Table 7.

TABLE 7

| EN-DC scenario | PSCC intra-frequency | PSCC service frequency inter-system |
|---|---|---|
| There is PSCC service frequency inter-system | 100/(100 − X) | 100/X |
| There is no PSCC service frequency inter-system | 1 | N/A |

In some embodiments, the terminal device allocates a corresponding measurement opportunity to gap-less inter-system measurement in the searcher #1 and the searcher #2, to reduce a delay of inter-system measurement.

The embodiments corresponding to Table 3 to Table 7 are described based on an assumption that the searcher #1 and the searcher #2 are configured for the UE. For low-cost (low-cost) UE that does not support CA, another method for calculating a carrier specific scaling factor of gap-less measurement is proposed in some embodiments.

Another example of a method for calculating a carrier specific scaling factor in an EN-DC scenario is provided below.

UE allocates a searcher between measurements at frequencies based on the following baseline assumptions:

1. In some embodiments, a searcher #1 is configured for the UE.

2. Gap-less intra-frequency measurement on a PSCC exclusively occupies X % of opportunities of the searcher #1.

Optionally, X is a fixed value specified in a protocol, and 0<X<100, for example, X %=25% or 50%.

Optionally, a network device notifies a terminal device of an allocation proportion X % of searchers corresponding to different gap-less measurement types by sending system information (system information, SI) or an RRC message.

Optionally, the network device notifies the terminal device of a set of candidate search resource allocation proportions by sending SI or an RRC message, and then notify the terminal device of one X % of candidate values by using signaling.

3. In an embodiment, remaining measurement opportunities of the searcher #1 are equally divided by gap-less service frequency inter-system measurement, gap-less non-service frequency inter-system measurement, and gap-less inter-frequency measurement on the PSCC.

In some embodiments, in this embodiment, there is one PSCC, and no SCC exists. Therefore, N1=0 and N2=1.

Correspondingly, $CSSF_{outside\_gap}$ corresponding to each type of measurement is shown in Table 8.

TABLE 8

| EN-DC scenario | PSCC intra-frequency | PSCC service frequency inter-system | Non-service frequency inter-system | Inter-frequency |
|---|---|---|---|---|
| There is PSCC service frequency inter-system | 100/X | 100/(100 − X) * (1 + N3 + N4) | 100/(100 − X) * (1 + N3 + N4) | 100/(100 − X) * (1 + N3 + N4) |
| There is no PSCC service frequency inter-system | 100/X | N/A | 100/(100 − X) * (N3 + N4) | 100/(100 − X) * (N3 + N4) |

3. In another embodiment, the service frequency inter-system measurement on the PSCC exclusively occupies Y % of opportunities of the searcher #1.

Optionally, Y is a fixed value specified in a protocol, and 0<Y<100, for example, Y %=25% or 50%.

Optionally, the network device notifies the terminal device of the used allocation proportion Y % of the searcher by sending system information (system information, SI) or an RRC message.

Optionally, the network device notifies the terminal device of a set of candidate search resource allocation proportions by sending SI or an RRC message, and then notify the terminal device of one Y % of candidate values by using signaling.

4. Remaining measurement opportunities of the searcher #1 are equally divided by gap-less non-service frequency inter-system measurement and gap-less inter-frequency measurement.

In some embodiments, in this embodiment, N1=0 and N2=1.

Correspondingly, $CSSF_{outside\_gap}$ corresponding to each type of measurement is shown in Table 9.

TABLE 9

| EN-DC scenario | PSCC intra-frequency | PSCC service frequency inter-system | Non-service frequency inter-system | Inter-frequency |
|---|---|---|---|---|
| There is PSCC service frequency inter-system | 100/X | 100/Y | 100/(100 − X − Y) * (N3 + N4) | 100/(100 − X − Y) * (N3 + N4) |
| There is no PSCC service frequency inter-system | 100/X | N/A | 100/(100 − X) * (N3 + N4) | 100/(100 − X) * (N3 + N4) |

3. In another embodiment, gap-less inter-system measurements exclusively occupy Y % of opportunities of the searcher #1.

Optionally, Y is a fixed value specified in a protocol, and 0<Y<100, for example, Y %=25% or 50%.

Optionally, the network device notifies the terminal device of the used allocation proportion Y % of the searcher by sending system information (system information, SI) or an RRC message.

Optionally, the network device notifies the terminal device of a set of candidate search resource allocation proportions by sending SI or an RRC message, and then notify the terminal device of one Y % of candidate values by using signaling.

4. Remaining measurement opportunities of the searcher #1 are equally divided by gap-less inter-frequency measurements.

Correspondingly, $CSSF_{outside\_gap}$ corresponding to each type of measurement is shown in Table 10.

TABLE 10

| EN-DC scenario | PSCC intra-frequency | PSCC service frequency inter-system | Non-service frequency inter-system | Inter-frequency |
|---|---|---|---|---|
| There is PSCC service frequency inter-system | 100/X | 100/Y * (1 + N3) | 100/Y * (1 + N3) | 100/(100 − X − Y) * N4 |
| There is no PSCC service frequency inter-system | 100/X | N/A | 100/Y*N3 | 100/(100 − X − Y) * N4 |

3. In another embodiment, gap-less non-service frequency inter-system measurements exclusively occupy Y % of opportunities of the searcher #1.

Optionally, Y is a fixed value specified in a protocol, and 0<Y<100, for example, Y %=25% or 50%.

Optionally, the network device notifies the terminal device of the used allocation proportion Y % of the searcher by sending system information (system information, SI) or an RRC message.

Optionally, the network device notifies the terminal device of a set of candidate search resource allocation proportions by sending SI or an RRC message, and then notify the terminal device of one Y % of candidate values by using signaling.

4. Remaining measurement opportunities of the searcher #1 are equally divided by service frequency inter-system measurement and gap-less inter-frequency measurement.

In some embodiments, N1=0 and N2=1.

Correspondingly, $CSSF_{outside\_gap}$ corresponding to each type of measurement is shown in Table 11.

TABLE 11

| EN-DC scenario | PSCC intra-frequency | PSCC service frequency inter-system | Non-service frequency inter-system | Inter-frequency |
|---|---|---|---|---|
| There is PSCC service frequency inter-system | 100/X | 100/(100 − X − Y) * (1 + N4) | 100/Y * N3 | 100/(100 − X − Y) * (1 + N4) |
| There is no PSCC service frequency inter-system | 100/X | N/A | 100/Y*N3 | 100/(100 − X − Y) * N4 |

Another example of a method for calculating a carrier specific scaling factor in an EN-DC scenario is provided below.

UE allocates a searcher between measurements at frequencies based on the following baseline assumptions:

1. In some embodiments, a searcher #1 is configured for the UE.

2. Measurement opportunities of the searcher #1 are equally divided by PSCC intra-frequency measurements, gap-less inter-system measurements, and gap-less inter-frequency measurements. The gap-less inter-system measurement includes PSCC service frequency inter-system measurement and non-service frequency inter-system measurement.

In some embodiments, N1=0 and N2=1.

Correspondingly, $CSSF_{outside\_gap}$ corresponding to each type of measurement is shown in Table 12.

TABLE 12

| EN-DC scenario | PSCC intra-frequency | PSCC service frequency inter-system | Non-service frequency inter-system | Inter-frequency |
|---|---|---|---|---|
| There is PSCC service frequency inter-system | 1 + 1 + N3 + N4 | 1 + 1 + N3 + N4 | 1 + 1 + N3 + N4 | 1 + 1 + N3 + N4 |
| There is no PSCC service frequency inter-system | 1 + N3 + N4 | N/A | 1 + N3 + N4 | 1 + N3 + N4 |

In some embodiments, one searcher is used for low-cost UE that does not support CA, so that an applicable range of CSSF calculation is extended.

The foregoing embodiments further is used in an NR-DC scenario. In some embodiments, service frequency inter-system measurement is replaced with intra-frequency measurement configured by an NR primary cell PCell.

Some embodiments provide a method for calculating a carrier specific scaling factor outside a measurement gap. Based on the embodiments corresponding to Table 3 to Table 12, in response to the following measurement combination conditions being met, two measurements are considered as one measurement, so that CSSFs of the two measurements are reduced, and a measurement delay of an NR frequency is reduced.

The measurement combination conditions include the following conditions:

(a) EN-DC is intra-band synchronous EN-DC.

(b) System frame numbers (system frame number, SFN) of a PCell and a PSCell are aligned with a radio frame boundary.

(c) The two measurements correspond to same SMTC configuration.

(d) The two measurements correspond to same SSBToMeasure (measurement of an SSB) configuration.

(e) The two measurements correspond to same received signal strength indication (received signal strength indication, RSSI) configuration.

(f) The two measurements correspond to same deriveSSBIndexFromCell configuration.

In response to the two measurements meeting the foregoing combination conditions, the following two measurements are combined into one measurement. Correspondingly, N1, N2, N3, and N4 in Table 3 to Table 11 is corrected as follows:

1. In response to service frequency inter-system measurement and intra-frequency measurement being at an NR service frequency meeting the measurement combination conditions, the terminal device subtracts 1 from N2 or subtracts 1 from N1, and re-determines, based on a quantity of to-be-measured service frequencies obtained after combination, $CSSF_{outside\_gap}$ corresponding to each type of measurement of each frequency.

For example, the terminal device performs service frequency inter-system measurement at three NR service frequencies, and performs intra-frequency measurement at eight NR service frequencies, and there are two frequencies at which both service frequency inter-system measurement and intra-frequency measurement is performed. In response to two measurements of one frequency meeting the foregoing measurement combination conditions, the terminal device subtracts 1 from 3 or subtracts 1 from 8. In response to two measurements of each of the two frequencies meeting the foregoing measurement combination conditions, the terminal device subtracts 2 from 3 or subtracts 2 from 8.

2. In response to non-service frequency inter-system measurement and inter-frequency measurement at an NR non-service frequency meeting the measurement combination conditions, the terminal device subtracts 1 from N3 or subtracts 1 from N4, and re-determines, based on a quantity of to-be-measured non-service frequencies obtained after combination, $CSSF_{outside\_gap}$ corresponding to each type of measurement of each frequency.

The method embodiments provided are described above, and apparatus embodiments provided are described below. In some embodiments, descriptions of the apparatus correspond to descriptions of the method embodiments. Therefore, for content that is not described in detail, refer to the foregoing method embodiments. For brevity, details are not described herein again.

Figure 5:
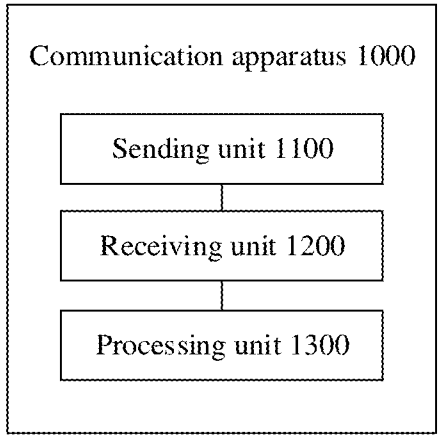
FIG. 5 is a schematic block diagram of a communication apparatus 1000 in accordance with some embodiments.

FIG. 5 is a schematic block diagram of a communication apparatus 1000 in accordance with some embodiments. As shown in FIG. 5, the communication apparatus 1000 includes a processing unit 1100 and a receiving unit 1300.

Optionally, the communication apparatus 1000 further includes a sending unit 1200.

In some solutions, the units of the communication apparatus 1000 are configured to perform the following steps and/or operations.

The receiving unit 1300 is configured to receive first measurement configuration information sent by an evolved universal terrestrial radio access E-UTRAN primary cell, where the first measurement configuration information includes M1 first measurement objects and M2 second measurement objects, M1≥0, M2≥0, M1 and M2 are integers, the first measurement object is an NR measurement object configured on a primary secondary component carrier PSCC or a secondary component carrier SCC, and the second measurement object is an NR measurement object configured on a frequency outside the PSCC and the SCC.

The receiving unit 1300 is further configured to receive second measurement configuration information sent by a new radio NR primary secondary cell, where the second measurement configuration information includes M3 third measurement objects, M4 fourth measurement objects, and M5 fifth measurement objects, 0≤M3≤1, M4≥0, M5≥0, M3, M4, and M5 are integers, the third measurement object is an NR measurement object configured on the PSCC, the fourth measurement object is an NR measurement object configured on the SCC, and the fifth measurement object is an NR measurement object configured on the frequency outside the PSCC and the SCC.

The processing unit 1100 is configured to calculate a CSSF outside a measurement gap of each measurement object in the M1 first measurement objects, the M2 second measurement objects, the M3 third measurement objects, the M4 fourth measurement objects, and the M5 fifth measurement objects.

Optionally, the first measurement object meets the following conditions: A synchronization signal block SSB indicated by the first measurement object is entirely included in an active bandwidth part BWP of the terminal device; and synchronization signal block measurement timing configuration SMTC included in the first measurement object is not covered by the MG, or is partially covered by the MG.

Optionally, the second measurement object meets the following conditions: An SSB indicated by the second measurement object is entirely included in an active BWP of the terminal device; and SMTC included in the second measurement object is not covered by the MG, or is partially covered by the MG.

Optionally, the third measurement object meets the following conditions: An SSB indicated by the third measurement object is entirely included in an active BWP of the terminal device, or an active downlink BWP is an initial BWP; and SMTC included in the third measurement object is not covered by the MG, or is partially covered by the MG.

Optionally, the fourth measurement object meets the following conditions: An SSB indicated by the fourth measurement object is entirely included in an active BWP of the terminal device, or an active downlink BWP is an initial BWP; and SMTC included in the fourth measurement object is not covered by the MG, or is partially covered by the MG.

Optionally, the fifth measurement object meets the following conditions: An SSB indicated by the fifth measurement object is entirely included in an active BWP of the terminal device; and SMTC included in the fifth measurement object is not covered by the MG, or is partially covered by the MG.

Optionally, the processing unit 1100 is configured to: in response to NR serving cells of a terminal device configured with the apparatus being in a first frequency range FR1, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5;

in response to NR serving cells of a terminal device configured with the apparatus being in a second frequency range FR2, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5;

in response to NR serving cells of a terminal device configured with the apparatus being separately located in an FR1 and an FR2, and a primary secondary cell PSCell is located in the FR1, a CSSF of the first measurement object is equal to 2*(M1+M2+M4+M5−1), a CSSF of the second measurement object is equal to 2*(M1+M2+M4+M5−1), and a CSSF of the third measurement object is equal to 1; and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 2*(M1+M2+M4+M5−1), and a CSSF of the fifth measurement object is equal to 2(M1+M2+M4+M5−1); and in response to NR serving cells of a terminal device configured with the apparatus being separately located in an FR1 and an FR2, and a primary secondary cell PSCell is located in the FR2, a CSSF of the first measurement object is equal to M1+M2+M4+M5, a CSSF of the second measurement object is equal to M1+M2+M4+M5, a CSSF of the third measurement object is equal to 1, a CSSF of the fourth measurement object is equal to M1+M2+M4+M5, and a CSSF of the fifth measurement object is equal to M1+M2+M4+M5.

Optionally, the processing unit 1100 is configured to: in response to NR serving cells of a terminal device configured with the apparatus being in a first frequency range FR1, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where 0<X<100;

in response to NR serving cells of a terminal device configured with the apparatus being on a same band in a second frequency range FR2, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where 0<X<100;

in response to NR serving cells of a terminal device configured with the apparatus being separately located in an FR1 and an FR2, and a primary secondary cell PSCell is located in the FR1, a CSSF of the first measurement object is equal to 100/X*M1, a CSSF of the second measurement object is equal to 100/(50−X)*(M4+M2+M5−1), a CSSF of the third measurement object is equal to 1, and in response to an SCC corresponding to the fourth measurement object being in the FR2 and the terminal device to measures a neighboring cell on the SCC corresponding to the fourth measurement object, a CSSF of the fourth measurement object is equal to 2, or otherwise, the CSSF of the fourth measurement object is equal to 100/(50−X)*(M4+M2+M5−1), and a CSSF of the fifth measurement object is equal to 100/(50−X)*(M4+M2+M5−1), where 0<X<50; and in response to NR serving cells of a terminal device configured with the apparatus being separately in an FR1 and an FR2, and a primary secondary cell PSCell is in the FR2, a CSSF of the first measurement object is equal to 100/X*M1, a CSSF of the second measurement object is equal to 100/(100−X)*(M4+M2+M5), a CSSF of the third measurement object is equal to 1, a CSSF of the fourth measurement object is equal to 100/(100−X)*(M4+M2+M5), and a CSSF of the fifth measurement object is equal to 100/(100−X)*(M4+M2+M5), where 0<X<100.

Optionally, the processing unit 1100 is configured to: in response to NR serving cells of a terminal device configured with the apparatus being in a first frequency range FR1, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100;

in response to NR serving cells of a terminal device configured with the apparatus being on a same band in a second frequency range FR2, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100;

in response to NR serving cells of a terminal device configured with the apparatus being separately located in an FR1 and an FR2, and a primary secondary cell PSCell is located in the FR1, a CSSF of the first measurement object is equal to 100/X*(M1+M2), a CSSF of the second measurement object is equal to 100/X*(M1+M2), a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)(M4+M5−1), and a CSSF of the fifth measurement object is equal to 100/(50−X)(M4+M5−1), where 0<X<50; and in response to NR serving cells of a terminal device configured with the apparatus being separately in an FR1 and an FR2, and a primary secondary cell PSCell is in the FR2, a CSSF of the first measurement object is equal to 100/X*(M1+M2), a CSSF of the second measurement object is equal to 100/X*(M1+M2), a CSSF of the third measurement object is equal to 1, a CSSF of the fourth measurement object is equal to 100/(100−X)*(M4+M5), and a CSSF of the fifth measurement object is equal to 100/(100−X)*(M4+M5), where 0<X<100.

Optionally, the processing unit 1100 is configured to: in response to NR serving cells of a terminal device configured with the apparatus being in a first frequency range FR1, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100; and in response to NR serving cells of a terminal device configured with the apparatus being on a same band in a second frequency range FR2, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100;

in response to NR serving cells of a terminal device configured with the apparatus being separately located in an FR1 and an FR2, and a primary secondary cell PSCell is located in the FR1, a CSSF of the first measurement object is equal to 100/(50−X)*(M4+M1+M5−1), a CSSF of the second measurement object is equal to 100/X*M2, a CSSF of the third measurement object is equal to 1, and in response to an SCC corresponding to the fourth measurement object being in the FR2 and the terminal device measures a neighboring cell on the SCC corresponding to the fourth measurement object, a CSSF of the fourth measurement object is equal to 2, or otherwise, the CSSF of the fourth measurement object is equal to 100/(50−X)*(M4+M1+M5−1), and a CSSF of the fifth measurement object is equal to 100/(50−X)*(M4+M1+M5−1), where 0<X<50; and in response to NR serving cells of a terminal device configured with the apparatus being separately in an FR1 and an FR2, and a primary secondary cell PSCell is in the FR2, a CSSF of the first measurement object is equal to 100/(100−X)*(M4+M1+M5), a CSSF of the second measurement object is equal to 100/X*M2, a CSSF of the third measurement object is equal to 1, a CSSF of the fourth measurement object is equal to 100/(100−X)*(M4+M1+M5), and a CSSF of the fifth measurement object is equal to 100/(100−X)*(M4+M1+M5), where 0<X<100.

Optionally, the processing unit 1110 is configured to determine X based on any one of the following methods: The receiving unit 1300 is configured to receive a first message sent by a network device, where the first message includes X; and the processing unit 1110 is configured to determine X based on the first message. Alternatively, the receiving unit 1300 is configured to receive a second message sent by a network device, where the second message includes a plurality of candidate measurement resource allocation proportions including X; the receiving unit 1300 is configured to receive first indication information sent by the network device, where the first indication information is used to indicate the processing unit 1110 to allocate a measurement resource by using X; and the processing unit 1110 is configured to determine X according to the first indication information. Alternatively, the processing unit 1110 is configured to determine X based on a fixed measurement resource allocation proportion described in a protocol.

Optionally, X=25 or 50.

In some other solutions, the units of the communication apparatus 1000 are further configured to perform the following steps and/or operations.

The receiving unit 1300 is configured to receive first measurement configuration information sent by an evolved universal terrestrial radio access E-UTRAN primary cell, where the first measurement configuration information includes M1 first measurement objects and M2 second measurement objects, 0≤M1≤1, M2≥0, M1 and M2 are integers, the first measurement object is an NR measurement object configured on a primary secondary component carrier PSCC, and the second measurement object is an NR measurement object configured on a frequency outside the PSCC.

The receiving unit 1300 is further configured to receive second measurement configuration information sent by a new radio NR primary secondary cell, where the second measurement configuration information includes M3 third measurement objects and M5 fifth measurement objects, 0≤M3≤1, M5≥0, M3 and M5 are integers, the third measurement object is an NR measurement object configured on the PSCC, and the fifth measurement object is an NR measurement object configured on a frequency outside the PSCC.

The processing unit 1100 is configured to calculate a CSSF outside a measurement gap MG of each measurement object in the M1 first measurement objects, the M2 second measurement objects, the M3 third measurement objects, and the M5 fifth measurement objects.

Optionally, the first measurement object measured outside the MG meets the following conditions: A synchronization signal block SSB included by the first measurement object is entirely included in an active bandwidth part BWP of the terminal device; and synchronization signal block measurement timing configuration SMTC included in the first measurement object is not covered by the MG, or is partially covered by the MG.

Optionally, the first measurement object meets the following conditions: A synchronization signal block SSB indicated by the first measurement object is entirely included in an active bandwidth part BWP of the terminal device; and synchronization signal block measurement timing configuration SMTC included in the first measurement object is not covered by the MG, or is partially covered by the MG.

Optionally, the second measurement object meets the following conditions: An SSB indicated by the second measurement object is entirely included in an active BWP of the terminal device; and SMTC included in the second measurement object is not covered by the MG, or is partially covered by the MG.

Optionally, the third measurement object meets the following conditions: An SSB indicated by the third measurement object is entirely included in an active BWP of the terminal device, or an active downlink BWP is an initial BWP; and SMTC included in the third measurement object is not covered by the MG, or is partially covered by the MG.

Optionally, the fifth measurement object meets the following conditions: An SSB indicated by the fifth measurement object is entirely included in an active BWP of the terminal device; and SMTC included in the fifth measurement object is not covered by the MG, or is partially covered by the MG.

Optionally, the processing unit 1100 is configured to: learn, through calculation, that a CSSF of the first measurement object is equal to 100/(100−M3*X)*(M1+M2+M5), learn, through calculation, that a CSSF of the second measurement object is equal to 100/(100−M3*X)*(M1+M2+M5), learn, through calculation, that a CSSF of the third measurement object is equal to 100/X, and learn, through calculation, that a CSSF of the fifth measurement object is equal to 100/(100−M3*X)*(M1+M2+M5), where 0<X<100.

Optionally, the processing unit 1100 is configured to: learn, through calculation, that a CSSF of the first measurement object is equal to 100/Y, learn, through calculation, that a CSSF of the second measurement object is equal to 100/(100−M3*X−M1*Y)*(M2+M5), learn, through calculation, that a CSSF of the third measurement object is equal to 100/X, and learn, through calculation, that a CSSF of the fifth measurement object is equal to 100/(100−M3*X−M1*Y)*(M2+M5), where 0<X<100, 0<Y<100, and 0<X+Y<100.

Optionally, the processing unit 1100 is configured to: learn, through calculation, that a CSSF of the first measurement object is equal to 100/Y*(M1+M2), learn, through calculation, that a CSSF of the second measurement object is equal to 100/Y*(M1+M2), and learn, through calculation, that a CSSF of the third measurement object is equal to 100/X; and in response to M1=0 and M2=0, learn, through calculation, that a CSSF of the fifth measurement object is equal to 100/(100−M3*X)*M5, or otherwise, the CSSF of the fifth measurement object is equal to 100/(100−M3*X−Y)*M5, where 0<X<100, 0<Y<100, and 0<X+Y<100.

Optionally, the processing unit 1100 is configured to: in response to M2=0, learn, through calculation, that a CSSF of the first measurement object is equal to 100/(100−M3*X)*(M1+M5), or otherwise, the CSSF is equal to 100/(100−M3*X−Y)*(M1+M5), learn, through calculation, that a CSSF of the second measurement object is equal to 100/Y*M2, learn, through calculation, that a CSSF of the third measurement object is equal to 100/X, and learn, through calculation, that a CSSF of the fifth measurement object is 100/(100−M3*X)*(M1+M5), or otherwise, the CSSF is equal to 100/(100−M3*X−Y)*(M1+M5), where 0<X<100, 0<Y<100, and 0<X+Y<100.

Optionally, the processing unit 1100 is configured to: learn, through calculation, that a CSSF of the first measurement object is equal to M1+M2+M3+M5, learn, through calculation, that a CSSF of the second measurement object is equal to M1+M2+M3+M5, learn, through calculation, that a CSSF of the third measurement object is equal to M1+M2+M3+M5, and learn, through calculation, that a CSSF of the fifth measurement object is equal to M1+M2+M3+M5.

Optionally, the processing unit 1110 determines X based on any one of the following methods: The receiving unit 1300 is configured to receive a first message sent by a network device, where the first message includes X; and the processing unit 1110 is configured to determine X based on the first message. Alternatively, the receiving unit 1300 is configured to receive a second message sent by a network device, where the second message includes a plurality of candidate measurement resource allocation proportions including X; the receiving unit 1300 is configured to receive first indication information sent by the network device, where the first indication information is used to indicate the processing unit 1110 to allocate a measurement resource by using X; and the processing unit 1110 is configured to determine X according to the first indication information. Alternatively, the processing unit 1110 is configured to determine X based on a fixed measurement resource allocation proportion described in a protocol.

Optionally, X=25 or 50, and Y=25 or 50.

In an implementation, the communication apparatus 1000 is the terminal device in the method embodiments. In this implementation, the sending unit 1200 is a transmitter, and the receiving unit 1300 is a receiver. The receiver and the transmitter alternatively is integrated into one transceiver. The processing unit 1100 is a processing apparatus.

In another implementation, the communication apparatus 1000 is a chip or an integrated circuit in the terminal device. In this implementation, the sending unit 1200 and the receiving unit 1300 is a communication interface or an interface circuit. For example, the sending unit 1200 is an output interface or an output circuit, the receiving unit 1300 is an input interface or an input circuit, and the processing unit 1300 is a processing apparatus.

A function of the processing apparatus is implemented by hardware, or are implemented by hardware by executing corresponding software. For example, the processing apparatus includes at least one processor and at least one memory. The at least one memory is configured to store a computer program, and the at least one processor reads and executes the computer program stored in the at least one memory, so that the communication apparatus 1000 performs operations and/or processing performed by the terminal device in the method embodiments.

Optionally, the processing apparatus includes a processor, and a memory configured to store a computer program is located outside the processing apparatus. The processor is connected to the memory by using a circuit/wire to read and execute a computer program stored in the memory. Optionally, in some examples, the processing apparatus alternatively is a chip or an integrated circuit.

Figure 6:
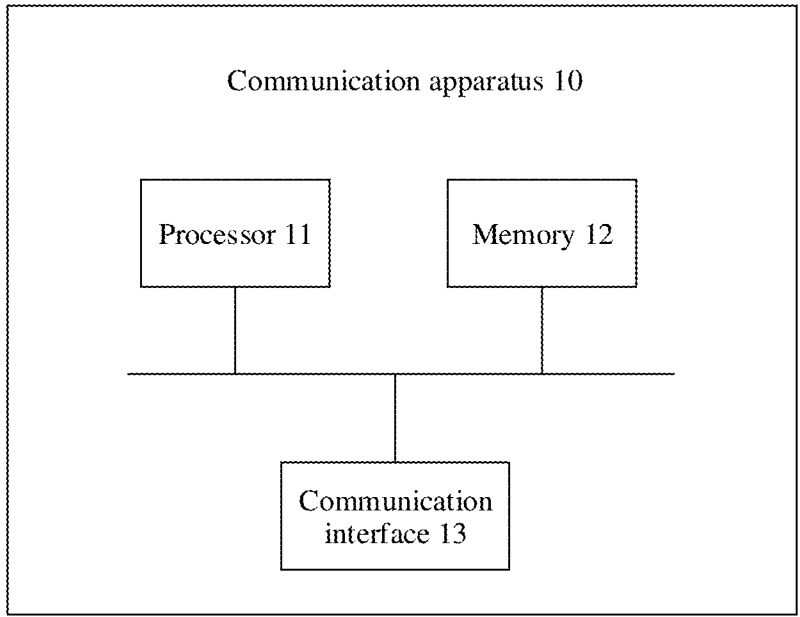
FIG. 6 is a schematic diagram of a structure of a communication apparatus 10 in accordance with some embodiments.

FIG. 6 is a schematic diagram of a structure of a communication apparatus 10 in accordance with some embodiments. As shown in FIG. 6, the communication apparatus 10 includes one or more processors 11, one or more memories 12, and one or more communication interfaces 13. The processor 11 is configured to control the communication interface 13 to receive and transmit a signal, the memory 12 is configured to store a computer program, and the processor 11 is configured to invoke the computer program from the memory 12 and run the computer program, so that a procedure and/or an operation performed by the terminal device in the method embodiments are/is performed.

For example, the processor 11 is configured to have a function of the processing unit 1100 shown in FIG. 5, and the communication interface 13 is configured to have a function of the sending unit 1200 and/or the receiving unit 1300 shown in FIG. 5. The processor 11 is configured to perform processing or an operation performed by the terminal device in FIG. 4, and the communication interface 13 is configured to perform the sending and/or receiving actions performed by the terminal device in FIG. 4.

In an implementation, the communication apparatus 10 is the terminal device in the method embodiments. In this implementation, the communication interface 13 is a transceiver. The transceiver includes a receiver and a transmitter. Optionally, the processor 11 is a baseband apparatus, and the communication interface 13 is a radio frequency apparatus. In another implementation, the communication apparatus 10 is a chip or an integrated circuit mounted in the terminal device. In this implementation, the communication interface 13 is an interface circuit or an input/output interface.

Optionally, the memory and the processor in the apparatus embodiments is physically independent units, or the memory and the processor is integrated. This is not limited.

In addition, some embodiments provide a computer-readable storage medium. The computer-readable storage medium stores computer instructions. In response to the computer instructions being run on a computer, operations and/or procedures performed by the terminal device in the method embodiments are executed.

Some embodiments provide a computer program product. The computer program product includes computer program code or instructions. In response to the computer program code or instructions being run on a computer, operations and/or procedures executed by the terminal device in the method embodiments are executed.

In addition, some embodiments provide a chip, and the chip includes a processor. A memory configured to store a computer program is disposed independent of the chip, and the processor is configured to execute the computer program stored in the memory, so that an operation and/or processing performed by the terminal device in any one of the method embodiments are/is executed.

Further, the chip further includes a communication interface. The communication interface is an input/output interface, an interface circuit, or the like. Further, the chip further includes the memory.

In addition, some embodiments provide a communication apparatus (for example, is a chip), including a processor and a communication interface. The communication interface is configured to receive a signal and transmit the signal to the processor, and the processor processes the signal, so that an operation and/or processing performed by the terminal device in any one of the method embodiments are/is performed.

In addition, some embodiments provide a wireless communication system, including one or more of the terminal device and the network device.

The processor in some embodiments is an integrated circuit chip, and has a signal processing capability. In an implementation process, steps in the foregoing method embodiments are implemented by using a hardware integrated logic circuit in the processor, or by using instructions in a form of software. The processor is a general-purpose processor, a digital signal processor (digital signal processor, DSP), an application-specific integrated circuit (application specific integrated circuit, ASIC), a field-programmable gate array (field programmable gate array, FPGA) or another programmable logic device, a discrete gate or transistor logic device, or a discrete hardware component. The general-purpose processor is a microprocessor, or the processor is any conventional processor or the like. The steps of the methods disclosed in some embodiments is directly performed and completed by a hardware encoding processor, or is performed and completed by a combination of hardware and a software module in an encoding processor. The software module is located in a mature storage medium in the art, such as a random access memory, a flash memory, a read-only memory, a programmable read-only memory, an electrically erasable programmable memory, or a register. The storage medium is located in the memory, and the processor reads information in the memory, and completes the steps in the foregoing methods in combination with hardware of the processor.

In some embodiments, the memory in some embodiments is a volatile memory or a non-volatile memory, or includes a volatile memory and a non-volatile memory. The non-volatile memory is a read-only memory (read-only memory, ROM), a programmable read-only memory (programmable ROM, PROM), an erasable programmable read-only memory (erasable PROM, EPROM), an electrically erasable programmable read-only memory (Electrically EPROM, EEPROM), or a flash memory. The volatile memory is a random access memory (random access memory, RAM), and is used as an external cache. By way of example and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). In some embodiments, the memory in the systems and methods described in the embodiments includes but is not limited to these and any memory of another appropriate type.

A person of ordinary skill in the art is aware that, in combination with the examples described in embodiments disclosed in the embodiments, units and algorithm steps are implemented by electronic hardware or a combination of computer software and electronic hardware. Whether the functions are performed by hardware or software depends on particular applications and design constraint conditions of the technical solutions. A person skilled in the art is able to use different methods to implement the described functions for each particular application, but implementation beyond the scope of the embodiments is unrealistic.

A person skilled in the art that, for the purpose of convenient and brief description, for a detailed working process of the foregoing system, apparatus, and unit, refer to a corresponding process in the foregoing method embodiments. Details are not described herein again.

The disclosed systems, apparatuses, and methods are implemented in other manners. For example, the described apparatus embodiment is an example. For example, division into the units is logical function division and is other division in an implementation. For example, a plurality of units or components are combined or integrated into another system, or some features are ignored or not performed. In addition, the displayed or discussed mutual couplings or direct couplings or communication connections are implemented by using some interfaces. The indirect couplings or communication connections between the apparatuses or units are implemented in electrical, mechanical, or other forms.

The units described as separate parts is or is unable to be physically separate, and parts displayed as units are or are unable to be physical units, is located in one position, or is distributed on a plurality of network units. Some or all the units are selected based on conditions to achieve the objectives of the solutions of the embodiments.

In addition, functional units in some embodiments is integrated into one processing unit, each of the units exists alone physically, or two or more units are integrated into one unit.

The term "and/or" in some embodiments describe an association relationship for describing associated objects and represents that three relationships exists. For example, A and/or B represents the following three cases: A exists, both A and B exist, and B exists. Each of A, B, and C is a singular number or a plural number, and this is not limited.

In response to the functions being implemented in the form of a software functional unit and sold or used as an independent product, the functions are stored in a computer-readable storage medium. Based on such an understanding, the technical solutions of the embodiments, or the part contributing to the conventional technology, or some of the technical solutions are implemented in a form of a software product. The computer software product is stored in a storage medium, and includes several instructions for instructing a computer device (which is a personal computer, a server, a network device, or the like) to perform all or some of the steps of the methods described in the embodiments. The foregoing storage medium includes any medium that stores program code, such as a USB flash drive, a removable hard disk, a ROM, a RAM, a magnetic disk, or an optical disc.

The foregoing descriptions are implementations of the embodiments, but are not intended to limit the protection scope. Any variation or replacement readily figured out by a person skilled in the art within the technical scope disclosed in the embodiments shall fall within the protection scope. Therefore, the protection scope of the embodiments shall be subject to the protection scope of the claims.

What is claimed is:

1. A method, comprising:

receiving, by a terminal device, first measurement configuration information sent by an evolved universal terrestrial radio access (E-UTRAN) primary cell, wherein:
  - the first measurement configuration information includes M1 first measurement objects:
  - M1≥0;
  - M1 is integer; and
  - a first measurement object is a new radio (NR) measurement object configured on a primary secondary component carrier (PSCC) or a secondary component carrier (SCC), and receiving, by the terminal device, second measurement configuration information sent by a NR primary secondary cell, wherein:
  - the second measurement configuration information includes M3 third measurement objects;
  - M4 fourth measurement objects;
  - 0≤M3≤1;
  - M4≥0;
  - M3 and M4 are integers;
  - a third measurement object is the NR measurement object configured on the PSCC; and
  - a fourth measurement object is the NR measurement object configured on the SCC, and calculating, by the terminal device, a carrier specific scale factor (CSSF) outside a measurement gap (MG) of each measurement object in the M1 first measurement objects, the M3 third measurement objects, and the M4 fourth measurement objects, wherein, in response to NR serving cells of the terminal device being in a first frequency range FR1, a CSSF of the first measurement object is equal to M1+M4, a CSSF of the third measurement object is equal to 1, and a CSSF of the fourth measurement object is equal to M1+M4.

2. The method according to claim 1, wherein:

the first measurement object meets the following conditions:

a synchronization signal block SSB indicated by the first measurement object is completely in an active bandwidth part BWP of the terminal device; and synchronization signal block measurement timing configuration SMTC included in the first measurement object is uncovered by the MG, or is partially covered by the MG.

3. The method according to claim 1, wherein:

the third measurement object meets the following conditions:

an SSB indicated by the third measurement object is completely in an active BWP of the terminal device, or an active downlink BWP is an initial BWP; and SMTC included in the third measurement object is uncovered by the MG, or is partially covered by the MG.

4. The method according to claim 1, wherein:

the fourth measurement object meets the following conditions:

an SSB indicated by the fourth measurement object is completely in an active BWP of the terminal device, or an active downlink BWP is an initial BWP; and SMTC included in the fourth measurement object is uncovered by the MG, or is partially covered by the MG.

5. The method according to claim 1, wherein:

the calculating, by the terminal device, the CSSF outside the MG of each measurement object in the M1 first measurement objects, the M3 third measurement objects, and the M4 fourth measurement objects, comprises:

in response to the NR serving cells of the terminal device being in a second frequency range FR2, the CSSF of the first measurement object is equal to M1+M4, the CSSF of the third measurement object is equal to 1, and the CSSF of the fourth measurement object is equal to M1+M4;

in response to the NR serving cells of the terminal device being separately included in an FR1 and an FR2, and the NR primary secondary cell is included in the FR1, the CSSF of the first measurement object is equal to 2*(M1+M4−1), wherein * indicates that a multiplication operation is performed, and the CSSF of the third measurement object is equal to 1, in response to an SCC corresponding to the fourth measurement object being in the FR2 and the terminal device calling for measurement of a neighboring cell on the SCC corresponding to the fourth measurement object, a CSSF of the fourth measurement object is equal to 2, or the CSSF of the fourth measurement object is equal to 2*(M1+M4−1); and in response to the NR serving cells of the terminal device being separately included in an FR1 and an FR2, and the NR primary secondary cell is included in the FR2, the CSSF of the first measurement object is equal to M1+M4, the CSSF of the third measurement object is equal to 1, and the CSSF of the fourth measurement object is equal to M1+M4.

6. The method according to claim 1, wherein:

the second measurement configuration information further includes:

M5 fifth measurement objects;

M5≥0 and M5 is an integer; and a fifth measurement object is an NR measurement object configured on a frequency outside the PSCC and the SCC; and the calculating, by the terminal device, the CSSF outside a MG of each measurement object in the M1 first measurement objects, the M3 third measurement objects, and the M4 fourth measurement objects comprising:

calculating, by the terminal device, a CSSF outside a measurement gap of each measurement object in the M1 first measurement objects, M2 second measurement objects, the M3 third measurement objects, the M4 fourth measurement objects, and the M5 fifth measurement objects.

7. The method according to claim 6, wherein:

the fifth measurement object meets the following conditions:

an SSB indicated by the fifth measurement object is completely in an active BWP of the terminal device; and SMTC included in the fifth measurement object is uncovered by the MG, or is partially covered by the MG.

8. The method according to claim 6, wherein:

the calculating, by the terminal device, the CSSF outside the measurement gap of each measurement object in the M1 first measurement objects, the M3 third measurement objects, the M4 fourth measurement objects, and the M5 fifth measurement objects comprises:

in response to NR serving cells of the terminal device being in a first frequency range FR1, a CSSF of the first measurement object is equal to M1+M4+M5, a CSSF of the third measurement object is equal to 1, a CSSF of the fourth measurement object is equal to M1+M4+M5, and a CSSF of the fifth measurement object is equal to M1+M4+M5;

in response to the NR serving cells of the terminal device being in a second frequency range FR2, the CSSF of the first measurement object is equal to M1+M4+M5, the CSSF of the third measurement object is equal to 1, the CSSF of the fourth measurement object is equal to M1+M4+M5, and the CSSF of the fifth measurement object is equal to M1+M4+M5;

in response to the NR serving cells of the terminal device being separately included in an FR1 and an FR2, and the NR primary secondary cell is included in the FR1, the CSSF of the first measurement object is equal to 2*(M1+M4+M5−1), wherein * indicates that a multiplication operation is performed, a CSSF of the third measurement object is equal to 1, in response to an SCC corresponding to the fourth measurement object is included in the FR2 and the terminal device is calling for measurement of a neighboring cell on the SCC corresponding to the fourth measurement object, a CSSF of the fourth measurement object is equal to 2, or the CSSF of the fourth measurement object is equal to 2*(M1+M4+M5−1), and the CSSF of the fifth measurement object is equal to 2*(M1+M4+M5−1); and in response to the NR serving cells of the terminal device being separately included in an FR1 and an FR2, and the NR primary secondary cell is included in the FR2, the CSSF of the first measurement object is equal to M1+M4+M5, the CSSF of the third measurement object is equal to 1, the CSSF of the fourth measurement object is equal to M1+M4+M5, and the CSSF of the fifth measurement object is equal to M1+M4+M5.

9. The method according to claim 6, wherein:

in response to measurement combination conditions being satisfied, two measurement objects, of the first, second, third, fourth, and fifth measurement objects, are represented as one measurement object.

10. The method according to claim 9, wherein:

the measurement combination conditions include:

the method is applied to an evolved universal terrestrial radio access-new radio dual-connectivity (EN-DC) that is an intra-band synchronous EN-DC;

system frame numbers of a PCell and a PSCell are aligned with a radio frame boundary;

the two measurement objects correspond to same SMTC configuration;

the two measurement objects correspond to same SSBToMeasure configuration;

the two measurement objects correspond to same received signal strength indication configuration; and the two measurement objects correspond to same deriveSSB IndexFromCell configuration.

11. An apparatus, comprises:

one or more processors; and one or more non-transitory computer readable memories coupled to the one or more processors and storing programming to be executed by the one or more processors, the programming including instructions to:

receive first measurement configuration information sent by an evolved universal terrestrial radio access (E-UTRAN) primary cell, wherein the first measurement configuration information includes M1 first measurement objects, M1≥0, M1 is integer, a first measurement object is a new radio (NR) measurement object configured on a primary secondary component carrier (PSCC) or a secondary component carrier (SCC), and receive, second measurement configuration information sent by a NR primary secondary cell, wherein the second measurement configuration information includes M3 third measurement objects, and M4 fourth measurement objects, 0≤M3≤1, M4≥0, M3, and M4 are integers, a third measurement object is the NR measurement object configured on the PSCC, a fourth measurement object is the NR measurement object configured on the SCC, and determine a carrier specific scale factor (CSSF) outside a measurement gap (MG) of each measurement object in the M1 first measurement objects, the M3 third measurement objects, and the M4 fourth measurement objects, wherein, in response to NR serving cells being in a first frequency range FR1, a CSSF of the first measurement object is equal to M1+M4, a CSSF of the third measurement object is equal to 1, and a CSSF of the fourth measurement object is equal to M1+M4.

12. The apparatus according to claim 11, wherein:

the first measurement object meets the following conditions:

a synchronization signal block SSB indicated by the first measurement object is completely in an active bandwidth part BWP; and synchronization signal block measurement timing configuration (SMTC) included in the first measurement object is uncovered by the MG, or is partially covered by the MG.

13. The apparatus according to claim 11, wherein:

the third measurement object meets the following conditions:

an SSB indicated by the third measurement object is completely in an active BWP, or a active downlink BWP is an initial BWP; and SMTC included in the third measurement object is uncovered by the MG, or is partially covered by the MG.

14. The apparatus according to claim 11, wherein:

the fourth measurement object meets the following conditions:

an SSB indicated by the fourth measurement object is completely in an active BWP, or a active downlink BWP is an initial BWP; and SMTC included in the fourth measurement object is uncovered by the MG, or is partially covered by the MG.

15. The apparatus according to claim 11, wherein:

the determining the CSSF outside the MG of each measurement object in the M1 first measurement objects, the M3 third measurement objects, and the M4 fourth measurement objects, comprises:

in response to the NR serving cells being included in a second frequency range FR2, the CSSF of the first measurement object is equal to M1+M4, the CSSF of the third measurement object is equal to 1, and the CSSF of the fourth measurement object is equal to M1+M4;

in response to the NR serving cells being separately included in an FR1 and an FR2, and the NR primary secondary cell is included in the FR1, the CSSF of the first measurement object is equal to 2*(M1+M4−1), wherein * indicates that a multiplication operation is performed, and the CSSF of the third measurement object is equal to 1, in response to an SCC corresponding to the fourth measurement object being included in the FR2 and a call for measurement of a neighboring cell on the SCC corresponding to the fourth measurement object, a CSSF of the fourth measurement object is equal to 2, or, the CSSF of the fourth measurement object is equal to 2*(M1+M4−1); and in response to the NR serving cells being separately included in an FR1 and an FR2, and the NR primary secondary cell is included in the FR2, the CSSF of the first measurement object is equal to M1+M4, the CSSF of the third measurement object is equal to 1, and the CSSF of the fourth measurement object is equal to M1+M4.

16. The apparatus according to claim 11, wherein:

the second measurement configuration information further includes M5 fifth measurement objects, M5≥0 and M5 is integer, a fifth measurement object is an NR measurement object configured on a frequency outside the PSCC and the SCC; and the determining a CSSF outside a measurement gap of each measurement object in the M1 first measurement objects, the M3 third measurement objects, and the M4 fourth measurement objects comprises:

determine a CSSF outside a MG of each measurement object in the M1 first measurement objects, M2 second measurement objects, the M3 third measurement objects, the M4 fourth measurement objects, and the M5 fifth measurement objects.

17. The apparatus according to claim 16, wherein:

the fifth measurement object meets the following conditions:

an SSB indicated by the fifth measurement object is completely in an active BWP; and SMTC included in the fifth measurement object is uncovered by the MG, or is partially covered by the MG.

18. The apparatus according to claim 16, wherein:

the determining the CSSF outside the measurement gap of each measurement object in the M1 first measurement objects, the M3 third measurement objects, the M4 fourth measurement objects, and the M5 fifth measurement objects comprises:

in response to NR serving cells being included in a first frequency range FR1, a CSSF of the first measurement object is equal to M1+M4+M5, a CSSF of the third measurement object is equal to 1, a CSSF of the fourth measurement object is equal to M1+M4+M5, and a CSSF of the fifth measurement object is equal to M1+M4+M5;

in response to the NR serving cells being included in a second frequency range FR2, the CSSF of the first measurement object is equal to M1+M4+M5, the CSSF of the third measurement object is equal to 1, the CSSF of the fourth measurement object is equal to M1+M4+M5, and the CSSF of the fifth measurement object is equal to M1+M4+M5;

in response to the NR serving cells being separately included in an FR1 and an FR2, and the NR primary secondary cell is included in the FR1, the CSSF of the first measurement object is equal to 2*(M1+M4+M5−1), wherein * indicates that a multiplication operation is performed, the CSSF of the third measurement object is equal to 1, in response to an SCC corresponding to the fourth measurement object being included in the FR2 and a call for measurement of a neighboring cell on the SCC corresponding to the fourth measurement object, a CSSF of the fourth measurement object is equal to 2, or, the CSSF of the fourth measurement object is equal to 2*(M1+M4+M5−1), and the CSSF of the fifth measurement object is equal to 2*(M1+M4+M5−1); and in response to the NR serving cells being separately included in an FR1 and an FR2, and the NR primary secondary cell is included in the FR2, the CSSF of the first measurement object is equal to M1+M4+M5, the CSSF of the third measurement object is equal to 1, the CSSF of the fourth measurement object is equal to M1+M4+M5, and the CSSF of the fifth measurement object is equal to M1+M4+M5.

19. The apparatus according to claim 16, wherein:

in response to measurement combination conditions being satisfied, two measurement objects, of the first, second, third, fourth, and fifth measurement objects, are represented as one measurement object.

20. The apparatus according to claim 19, wherein:

the measurement combination conditions included:

an evolved universal terrestrial radio access-new radio dual-connectivity (EN-DC) is intra-band synchronous EN-DC;

system frame numbers of a PCell and a PSCell are aligned with a radio frame boundary;

the two measurement objects correspond to same SMTC configuration;

the two measurement objects correspond to same SSBToMeasure configuration;

the two measurement objects correspond to same received signal strength indication configuration; and the two measurement objects correspond to same deriveSSBIndexFromCell configuration.

* * * * *